US00RE50898E

(19) United States
(12) Reissued Patent
Watanabe

(10) Patent Number: US RE50,898 E
(45) Date of Reissued Patent: May 26, 2026

(54) HEAD UP DISPLAY APPARATUS AND DISPLAY CONTROL METHOD THEREOF

(71) Applicant: MAXELL, LTD., Kyoto (JP)

(72) Inventor: Toshimitsu Watanabe, Kyoto (JP)

(73) Assignee: MAXELL, LTD., Kyoto (JP)

(21) Appl. No.: 18/207,335

(22) Filed: Jun. 8, 2023

Related U.S. Patent Documents

Reissue of:
(64) Patent No.: 11,241,960
Issued: Feb. 8, 2022
Appl. No.: 16/606,508
PCT Filed: Feb. 21, 2018
PCT No.: PCT/JP2018/006167
§ 371 (c)(1),
(2) Date: Oct. 18, 2019
PCT Pub. No.: WO2018/193708
PCT Pub. Date: Oct. 25, 2018

(30) Foreign Application Priority Data

Apr. 19, 2017 (JP) ..... 2017-082473
Apr. 20, 2017 (JP) ..... 2017-083330
Apr. 21, 2017 (JP) ..... 2017-084188

(51) Int. Cl.
*B60R 1/02* (2006.01)
*B60K 35/10* (2024.01)
(Continued)

(52) U.S. Cl.
CPC ..... *B60R 1/025* (2013.01); *B60K 35/10* (2024.01); *B60K 35/231* (2024.01);
(Continued)

(58) Field of Classification Search
CPC ..... B60R 1/025; B60R 1/24; B60R 2300/205; B60K 35/10; B60K 35/231; B60K 35/235;
(Continued)

(56) References Cited

U.S. PATENT DOCUMENTS 5,519,410 A * 5/1996 Smalanskas ..... B60K 35/231 340/980
5,734,357 A * 3/1998 Matsumoto ..... G02B 27/0149 359/632
(Continued)

FOREIGN PATENT DOCUMENTS

JP 2009-292409 A 12/2009
JP 2010-070066 A 4/2010
(Continued)

OTHER PUBLICATIONS

International Search Report issued May 29, 2018 for the PCT International Application No. PCT/JP2018/006167.

*Primary Examiner* — C. Michelle Tarae
(74) *Attorney, Agent, or Firm* — Volpe Koenig

(57) ABSTRACT

A HUD apparatus, that can achieve favorable AR display by reducing display shift between a real and virtual image, includes: an image input unit that receives an image from a camera and extracts a predetermined object; an information acquiring unit that acquires object information containing the object's position and distance information containing the object's distance in space; an AR image creating unit that creates an AR image for superimposing on the object; a display position converter uses the acquired information to correct a position of an AR display area that is a range where the AR image is displayable in a visual recognition area and a display position of the AR image inside the AR display area; an AR display that controls superimposing of the AR image on the visual recognition area from data after the correction; and a display that displays the AR image on the visual recognition area.

10 Claims, 23 Drawing Sheets

(51) Int. Cl.

| | |
|---|---|
| ***B60K 35/231*** | (2024.01) |
| ***B60K 35/235*** | (2024.01) |
| ***B60K 35/28*** | (2024.01) |
| ***B60K 35/60*** | (2024.01) |
| ***B60K 35/65*** | (2024.01) |
| ***B60K 35/81*** | (2024.01) |
| ***B60R 1/24*** | (2022.01) |
| ***G06V 20/56*** | (2022.01) |

(52) U.S. Cl.
CPC ..... *B60K 35/235* (2024.01); *B60K 35/60* (2024.01); *B60K 35/81* (2024.01); *B60R 1/24* (2022.01); *G06V 20/56* (2022.01); *B60K 35/28* (2024.01); *B60K 35/654* (2024.01); *B60K 2360/176* (2024.01); *B60K 2360/177* (2024.01); *B60K 2360/179* (2024.01); *B60K 2360/334* (2024.01); *B60K 2360/785* (2024.01)

(58) Field of Classification Search
CPC ..... B60K 35/28; B60K 35/60; B60K 35/654; B60K 35/81; G06V 20/56; G06V 20/20; G09G 3/001; G09G 2340/0464; G09G 2380/10
See application file for complete search history.

(56) References Cited

U.S. PATENT DOCUMENTS

| | | | | |
|---|---|---|---|---|
| 5,812,332 | A * | 9/1998 | Freeman | B32B 17/10761 428/56 |
| 7,126,583 | B1 * | 10/2006 | Breed | B60K 35/10 345/173 |
| 8,351,123 | B2 * | 1/2013 | Moussa | G02B 27/0101 359/9 |
| 8,558,758 | B2 * | 10/2013 | Sato | G03B 5/00 345/9 |
| 8,773,329 | B2 * | 7/2014 | Sugiyama | G02B 27/0101 345/7 |
| 8,941,924 | B2 * | 1/2015 | Nakamura | B60K 35/23 359/633 |
| 8,970,453 | B2 * | 3/2015 | Sasaki | G01C 21/365 345/8 |
| 8,970,933 | B2 * | 3/2015 | Sasaki | H02P 8/22 359/221.3 |
| 9,258,515 | B2 * | 2/2016 | Tohda | H04N 5/7458 |
| 9,268,134 | B2 * | 2/2016 | Wang | G02B 27/01 |
| 10,254,551 | B2 * | 4/2019 | Kishigami | G02B 27/0101 |
| 10,539,790 | B2 * | 1/2020 | Oh | B60R 1/00 |
| 10,600,250 | B2 * | 3/2020 | Nakano | G06T 19/006 |
| 10,621,776 | B2 * | 4/2020 | Katagiri | G08G 1/0962 |
| 10,642,034 | B2 * | 5/2020 | Oshima | H04N 9/3111 |
| 10,732,420 | B2 * | 8/2020 | Lambert | G02B 27/0103 |
| 10,740,871 | B2 * | 8/2020 | Fu | G06T 3/20 |
| 10,754,154 | B2 * | 8/2020 | Kasazumi | B60R 11/02 |
| 10,852,818 | B2 * | 12/2020 | Saisho | B60K 35/00 |
| 2009/0160736 | A1 * | 6/2009 | Kita | G02B 27/0101 345/7 |
| 2010/0066832 | A1 | 3/2010 | Nagahara et al. | |
| 2011/0074657 | A1 * | 3/2011 | Sugiyama | G02B 27/0101 345/7 |
| 2012/0050138 | A1 * | 3/2012 | Sato | G02B 27/01 345/4 |
| 2014/0313586 | A1 * | 10/2014 | Jan | G02B 27/0149 359/630 |
| 2014/0368745 | A1 * | 12/2014 | Tohda | B60K 35/658 348/745 |
| 2015/0170343 | A1 * | 6/2015 | Kwak | G02B 27/0179 345/647 |
| 2015/0226964 | A1 * | 8/2015 | Sasaki | B60K 35/233 359/631 |
| 2018/0339591 | A1 * | 11/2018 | Suzuki | B60K 35/10 |
| 2019/0025580 | A1 * | 1/2019 | Nagano | G02B 27/01 |
| 2019/0111844 | A1 * | 4/2019 | Suzuki | G02B 27/0093 |
| 2020/0035100 | A1 * | 1/2020 | Noda | G08G 1/166 |
| 2020/0064640 | A1 * | 2/2020 | Nagano | G09G 3/001 |

FOREIGN PATENT DOCUMENTS

| | | | |
|---|---|---|---|
| JP | 2010-149733 | A | 7/2010 |
| JP | 2015-064434 | A | 4/2015 |
| JP | 2016-222061 | A | 12/2016 |

* cited by examiner

*HUD: HEAD-UP DISPLAY AR: AUGMENTED REALITY

POINT-OF-VIEW POSITION (5)

FIFTH STATE

VISUAL RECOGNITION AREA OF FIELD OF VIEW OF DRIVER (STATE WITHOUT DISPLAY SHIFT BETWEEN REAL IMAGE AND VIRTUAL IMAGE)

STATE (1) WITH DISPLAY SHIFT BETWEEN REAL IMAGE AND VIRTUAL IMAGE

STATE (2) WITH DISPLAY SHIFT BETWEEN REAL IMAGE AND VIRTUAL IMAGE

BEFORE CONVERSION

AFTER FIRST CONVERSION

AFTER SECOND CONVERSION

STATE WITH REDUCED DISPLAY SHIFT BETWEEN REAL IMAGE AND VIRTUAL IMAGE

HEAD UP DISPLAY APPARATUS AND DISPLAY CONTROL METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a technique for a display apparatus such as a head up display (HUD: Head Up Display) apparatus, and relates to a technique for providing image information of augmented reality (AR: Augmented Reality) to a driver.

BACKGROUND ART

As AR display apparatuses each having an AR function and systems of the AR display apparatuses, a HUD apparatus mounted on a car or others is cited. In the HUD apparatus (called AR-HUD in some cases), by projection of image light, a virtual image is superimposed on a transparent real image in a visual recognition area (screen) of a windshield, a combiner or others in a field of view of a user such as a driver. The virtual image will be described as an AR image below in some cases. As the virtual image, for example, image information for driving support, etc., related to the real image including a road and a car ahead of the subject car, etc., is exemplified. As a specific example, an image of vehicle information such as a car speed, an arrow image such as navigation system indicating a car-running direction, a frame image for use in attention seeking that indicates approach of an oncoming car, a pedestrian, a bicycle or others and for use in emphasis of a road sign or others are exemplified. As source data for use in creation of the virtual image, information of on-vehicle sensor, engine controller, navigation system and others are usable.

The HUD apparatus includes, for example, a display element, an optical source, and an optical system such as a lens or a mirror for use in guiding image light to the visual recognition area. The image light from the display element is projected on an area (referred to as an AR display area, a HUD display range, etc., below in some cases) inside the visual recognition area of the windshield, the combiner or others through the mirror or others. The light reflected on the area inside the screen enters the driver's eyes, and forms an image on a retina, so that the driver visually recognizes the image as the virtual image.

As related-art examples related to the on-vehicle HUD apparatus, Japanese Patent Application Laid-Open Publication No. 2010-70066 (Patent Document 1) is cited. The Patent Document 1 describes that shift of a projection position of the image from a line of sight of either one of eyes due to vibration of the vehicle or change of a driver's posture is reduced in the head up display to enhance visual recognition of the display information.

RELATED ART DOCUMENT

Patent Document

Patent Document 1: Japanese Patent Application Laid-Open Publication No. 2010-70066

SUMMARY OF THE INVENTION

Problems to be Solved by the Invention

In an on-vehicle system including a conventional HUD apparatus, a virtual image is superimposed on a transparent real image in a visual recognition area of a windshield or others by using an AR function. At this time, when the driver is watching the visual recognition area, display shift between an object of the real image and the virtual image may occur depending on a driver's eye position (referred to as point-of-view position in some cases). In other words, a display position of the virtual image that is designed by the HUD apparatus and a display position of the virtual image that is practically visually recognized by the driver do not match each other in some cases.

As causes of the display shift between the real image and the virtual image, a case of the eye position change from a basic-setting eye position due to motion such as posture change caused when the driver moves, a case of a person having a different human body size or others who is watching the visual recognition area of the HUD apparatus as the same basic setting, etc., are cited.

In the HUD technique, depending on an eye position of a person (such as the driver) who is watching the visual recognition area, such as a position in height in a vertical direction, difference in a sight such as shift of a relative positional relation between the virtual image and the real image occurs. By a relation between the position of the virtual image formed by the HUD apparatus and a position of a watcher's eyes, a state of the image formed on the retina of the watcher is determined. When a predetermined relation between the position of the virtual image formed by the HUD apparatus and the position of the watcher's eyes is not satisfied, the watcher cannot visually recognize the virtual image. A range in which the eye position should be put for allowing the watcher to visually recognize the image is called eye box.

For example, when the point-of-view position of the driver changes in the vertical direction in the eye box range including a basic setting point-of-view position so as to be out of the eye box range, the driver cannot watch the virtual image or an entire display range of the virtual image. The driver adjusts the optical system such as an angle of the mirror so that the driver can watch the virtual image. However, as a result of the adjustment, the display shift between the real image and the virtual image occurs. In the visual recognition area of the field of view of the driver, the virtual image is displayed at a position that largely shifts from the object of the real image, and therefore, the driver is difficult to or cannot visually recognize the virtual image. The larger the display shift between the real image and the virtual image is, the more difficult the recognition of the virtual image by the driver is, and the more difficult a linking recognition between the real image and the virtual image is. That is, for the driver, such a virtual image is unsuitable.

A purpose of the present invention is related to a technique of a HUD apparatus having an AR function to provide a technique capable of achieving favorable AR display by reducing display shift between a real image and a virtual image in.

Means for Solving the Problems

A typical embodiment of the present invention is a head up display apparatus, and a feature of the embodiment is to have the following configuration.

A head up display apparatus of one embodiment is a head up display apparatus displaying, to a driver, a virtual image superimposed on scenery ahead of a vehicle by projecting an image onto a windshield or a combiner of the vehicle, the head up display apparatus including: an image input unit configured to receive an image captured by a camera as input and extract a predetermined object from the image; an information acquiring unit configured to acquire object information containing a position of the object inside the image and distance information containing a distance from the object in a space; an image creating unit configured to create an image of the virtual image to be superimposed on the object; a converter configured to, by using the acquired information, perform a conversion processing for correcting a position of a display area that is a range in which the image is displayable in a visual recognition area of the windshield or the combiner and a display position of the image inside the display area at least in a vertical up and down direction; a display controller configured to perform control for superimposing the image on the visual recognition area by using data caused after the correction; and a display configured to superimpose the image on the visual recognition area in accordance with the control, and the converter performs the conversion processing so that a display position of the image inside the display area matches a position of the object caused when the object is watched from a point-of-view position of the driver as a basic setting through the visual recognition area.

Effects of the Invention

According to a typical embodiment of the present invention, in a technique of to HUD apparatus having an AR function, display shift between a real image and a virtual image is reduced, so that favorable AR display is achieved.

BRIEF DESCRIPTIONS OF THE DRAWINGS

BEST MODE FOR CARRYING OUT THE INVENTION

Figure 1:
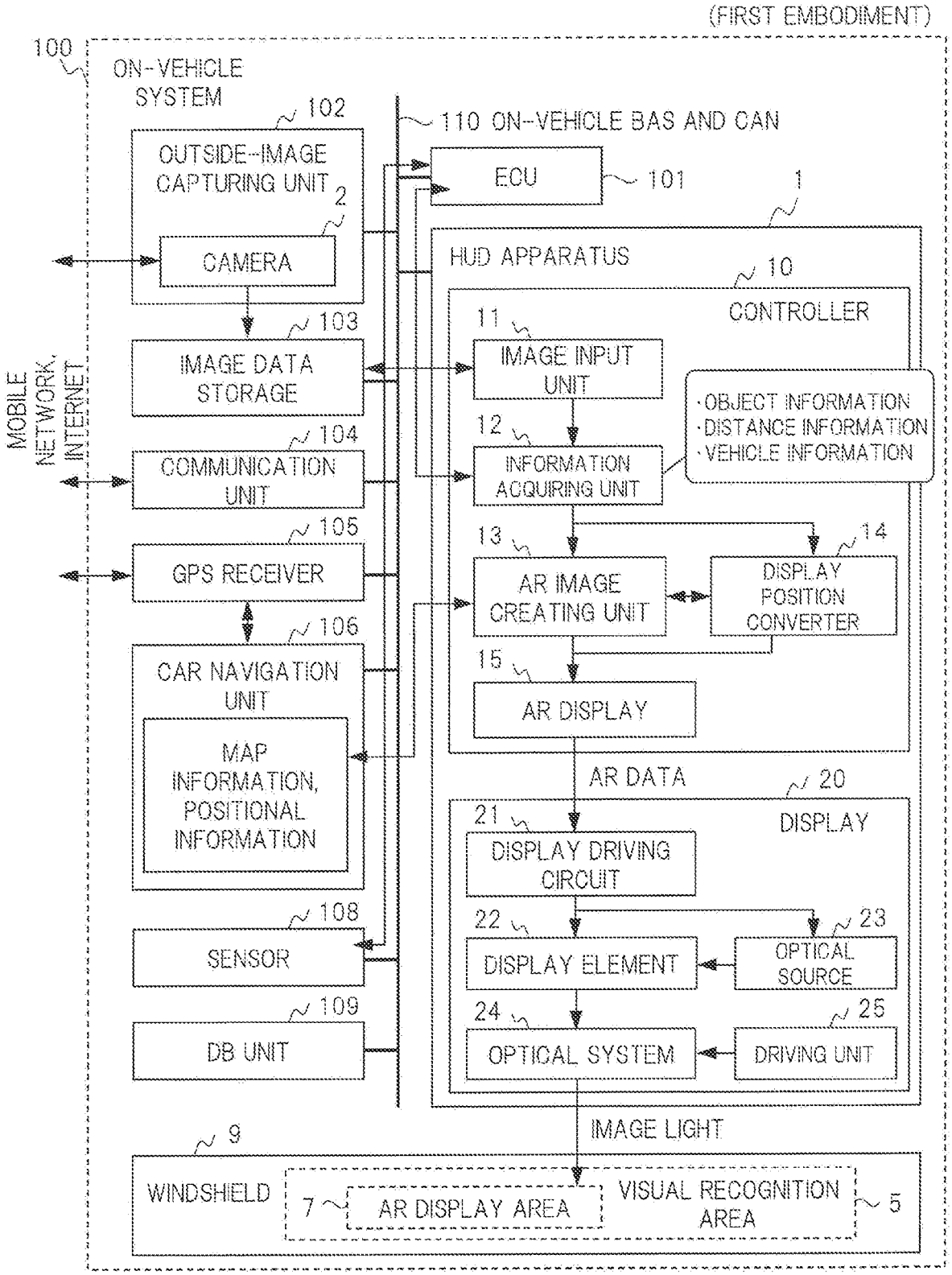
FIG. 1 is a diagram showing a configuration of an on-vehicle system including a HUD apparatus of a first embodiment of the present invention.

Hereinafter, embodiments of the present invention will be described in detail with reference to the accompanying drawings. Note that the same components are denoted by the same reference symbols throughout all the drawings for describing the embodiments, and the repetitive description thereof will be omitted.

First Embodiment

With reference to FIGS. 1 to 20, a head up display apparatus (HUD apparatus) of a first embodiment of the present invention and others will be described. The HUS apparatus of the first embodiment is an AR display apparatus having an AR function, and a case of mounting of the HUD apparatus as an on-vehicle AR-HUD will be described. A display control method of the first embodiment is a method having steps executed by the HUD apparatus of the first embodiment. The HUD apparatus of the first embodiment has a function of performing a conversion processing that automatically corrects the display position shift between the real image and the virtual image at the time of AR display by performing a program processing of a controller. In the first embodiment, even if the driver does not adjust the mirror of the optical system or others, an AR display content is corrected in a setting state without the adjustment.

Problems of Comparative Examples

As a comparative example of the first embodiment, the following problem of an on-vehicle system including a conventional HUD apparatus will be described. The HUD apparatus of the comparative example does not have the function of correcting the display shift between the real image and the virtual image as described in the first embodiment. Conventionally, in a usage example, the driver takes a driver's seat of a car, and performs a basic setting by adjusting the seat so as to match the driver's human body size and posture, and then, adjusting an AR display area (a HUD display range in which an AR image is displayable) of a visual recognition area of the HUD apparatus. For example, the driver manually adjusts an angle of a mirror of an optical system of the HUD apparatus so that the virtual image of the AR display area can be watched at a preferable position inside the visual recognition area ahead of a line of sight of the driver himself/herself. Note that such adjustment is referred to as basic setting in some cases.

When the driver is a person having a standard human body size, in a completion state of this basic setting, the driver can favorably visually recognize the virtual image displayed in the AR display area of the visual recognition area, and can use the AR function during the driving. Even if the point-of-view position of the driver slightly changes, the AR display area has room as long as the point of view is within the eye box range set as the basic setting, and therefore, the driver can visually recognize the virtual image. In this case, the driver does not particularly need readjustment of the angle of the mirror or others.

However, in some cases, the HUD apparatus at the time of usage of the AR function in the comparative example causes the shift between the display position of the virtual image that is practically watched from the point of view of the driver and the display position of the virtual image inside the AR display area that is designed by the HUD apparatus. For example, when the point-of-view position of the driver changes in a vertical direction from a point-of-view position set of basic setting, the virtual image is displayed at a position that is shift from the object of the real image in the visual recognition area of the field of view of the driver, and therefore, the driver is difficult to visually recognize the virtual image. For example, when the change of the point-of-view position of the driver is large so that the point-of-view position is out of the eye box range including the point-of-view position of the basic setting, the virtual image is not visually recognized or visually recognized in a state with the large display shift between the real image and the virtual image. The display shift appears in a distance between the real image and the virtual image inside the visual recognition area or others. When the display shift is smaller than a certain degree, the driver can recognize the object and the virtual image so as to link the object with the virtual image. However, when the display shift is equal or larger than the certain degree, the image is unsuitable as the virtual image of the AR.

In the HUD apparatus of the comparative example, the point-of-view position of the driver and a position of a camera for use in the AR function are different from each other. Further, in the HUD apparatus of the comparative example, an image-capturing direction and an angle of view of the camera are different from a direction and an angle of view of the AR display area watched from the point of view of the driver. Therefore, in some cases, the HUD apparatus of the comparative example causes the shift between the designed display position of the AR image and the position of the AR image watched from the driver.

[HUD Apparatus and On-Vehicle System]

FIG. 1 shows a configuration of an on-vehicle system 100 including a HUD apparatus 1 of the first embodiment. The on-vehicle system 100 is a system mounted on a car. The driver who is a user operates and uses the on-vehicle system 100 and the HUD apparatus 1. This HUD apparatus 1 is particularly an AR-HUS apparatus having the AR function.

The on-vehicle system 100 includes an ECU (Engine controller) 101, the HUD apparatus 1, an outside-image capturing unit 102 including a camera 2, an image data storage 103, a communication unit 104, a GPS (Global Positioning System) receiver 105, a car navigation unit 106, a sensor 108, a DB unit 109 and others, each of which is connected to an on-vehicle bus and CAN (Car Area Network) 110. The on-vehicle system 100 includes an audio output unit, an operation unit, a power supply unit and others, which are not illustrated.

The HUD apparatus 1 includes a controller 10 and a display 20. The HUD apparatus 1 has the AR function. The HUD apparatus 1 displays an AR image in an AR display area 7 of a visual recognition area 5 of a windshield 9 by using the AR function, so that various types of information can be given to the driver. The HUD apparatus 1 has a function of automatically correcting a position of the AR display area 7 that is a HUD display range in which the virtual image is displayable in the visual recognition area 5. By this function, the display shift between the virtual image and the real image in the watching of the visual recognition area 5 from the point of view of the driver is reduced. In combination use with the audio output unit, to the driver, the HUD apparatus 1 can give audio output such as guidance, an alarm, etc., using the car navigation function or the AR function. The HUD apparatus 1 also includes an operational panel, an operational button, etc., so that manual operational input by the driver such as turning ON/OFF of the AR function, user setting of the AR function, the adjustment of the angle of the mirror of the optical system 24, etc., is also achieved.

The controller 10 controls the entire HUD apparatus 1. The controller 10 includes hardware such as a CPU, a ROM and a RAM, and corresponding software. The controller 10 and other units may be implemented by using hardware such as a microcomputer or FPGA. The controller 10 achieves each unit such as an image input unit 11 by, for example, causing the CPU to read a program from the ROM and execute a processing in accordance with the program. The controller 10 stores various types of data and information in an internal memory or an external memory if needed, and reads the data and information or others. The controller 10 retains setting information for use in the AR function and others in a nonvolatile memory of memories. The setting information includes setting information for use in a conversion processing of the display position converter 14 and user setting information. The user setting information includes basic setting information for the angle of the mirror of the optical system 24 and others.

The controller 10 receives an image captured by the camera 2 as input, creates image data that is the AR data for use in displaying the virtual image onto the AR display area 7 of the visual recognition area 5 while using each types of the acquired information, and feeds the data to the display 20. The controller 10 has a function of correcting the position of the AR display area 7 of the visual recognition area 5 and the display position of the AR image inside the AR display area 7 at the time of creation of the AR data. The controller 10 can adjust a state of the angle of the mirror of the optical system 24 by controlling the display 20, so that the position of the AR display area 7 of the visual recognition area 5 can be adjusted for the basic setting.

The display 20 is configured of a projection-type image display apparatus (projector) or others. The display 20 includes a display driving circuit 21, a display element 22, an optical source 23, an optical system 24 and a driving unit 25, which are connected to one another. The display 20 generates image light for use in displaying the virtual image onto the visual recognition area 5 on the basis of the control by the controller 10 and the image data, and projects the image light onto the visual recognition area 5.

The display driving circuit 21 generates a display driving signal for use in the AR display in accordance with the image data output from the AR display 15, and feeds the signal to the display element 22 and the optical source 23 for driving control.

On the basis of the display driving signal, the optical source 23 generates illumination light to be supplied to the display element 22. The optical source 23 is configured of, for example, a high-pressure mercury lamp, a xenon lamp, an LED element, a laser element, or others. The light from the optical source 23 is caused to enter the display element 22 through an illumination optical system that is not illustrated. The illumination optical system collects and equalizes the illumination light, and is emitted to the display element 22.

The display element 22 generates the image light on the basis of the display driving signal and the illumination light from the optical source 23, and emits the image light to the optical system 24. The display element 22 is configured of, for example, an SLM (Spatial Light Modulator), a DMD (Digital Micromirror Device, registered trademark), a MEMS device, an LCD (a transparent-type liquid crystal panel or a reflection-type liquid crystal panel), or others.

Figure 2:
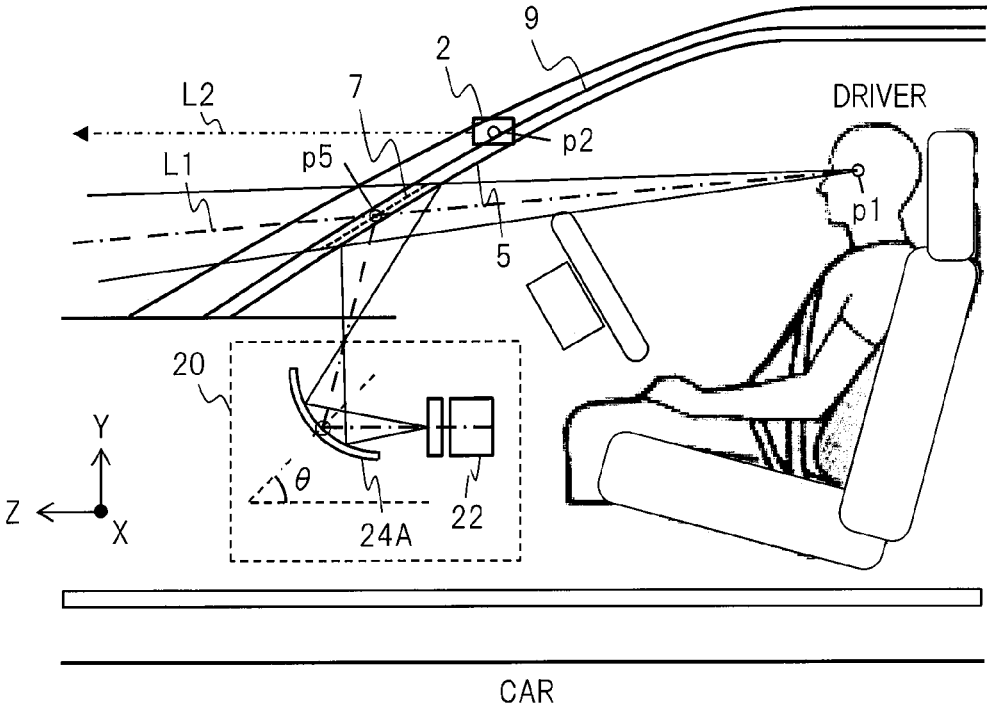
FIG. 2 is a diagram showing a state in which a vicinity of a driver's seat of a car is laterally watched in the first embodiment.

The optical system 24 includes elements such as a lens and a mirror for use in guiding the image light from the display element 22 to the visual recognition area 5 of the windshield 9 (FIG. 2). To the optical system 24, the driving unit 25 is connected. For example, the image light from the display element 22 is expanded by the lens of the optical system 24, is reflected by the mirror, and is projected onto the visual recognition area 5. That is, in a part of the visual recognition area 5, the AR display area 7 that is the HUD display range in which the image light is projected is generated. The image light is reflected on the AR display area 7 in the visual recognition area 5, enters the driver's eyes, and forms the image on the retina. In this manner, in the AR display area 7 of the visual recognition area 5 of the field of view of the driver, the virtual image is superimposed on the transparent real image.

The driving unit 25 is an optical system driving unit for use in driving the optical system 24, and includes a component such as a motor for use in driving the lens, the mirror and others. The driving unit 25 drives the optical system 24 so that, for example, the angle of the mirror changes in accordance with the manual operational input by the driver or the control from the controller 10. The driving unit 25 includes an operational button for use in, for example, adjusting the angle of the mirror. The driver can change the angle of the mirror in positive and negative directions with reference to a standard-set angle by performing up-and-down manual operations of the operational button. For example, the angle of the mirror changes in the positive direction (that is a direction of increasing the angle) while a first portion of the operational button is pushed, and the angle of the mirror changes in the negative direction (that is a direction of decreasing the angle) while a second portion thereof is pushed.

The ECU 101 performs vehicle control including engine control and entire control of the on-vehicle system 100. The ECU 101 is, in other words, a vehicle controller. The ECU 101 may have a sophisticated function for use in driving support and driving automatic control. In this case, the ECU 101 may output information related to the function to the HUD apparatus 1 and control the HUD apparatus 1 so as to allow the HUD apparatus 1 to display the AR image related to the function. On the basis of the detection information from the sensor 108, the ECU 101 recognizes the vehicle information containing a car-running state such as a car speed, and uses the information for the control. The HUD apparatus 1 can acquire the vehicle information from the ECU 101 and use the information for the AR display.

The outside-image capturing unit 102 includes the camera 2, and captures external-state images of the subject car by using one or more cameras 2 during the stop or the running of the subject car or others to acquire image data (containing time-series image frames) and around-vehicle information. The outside-image capturing unit 102 stores the image data or others in the image data storage 103, or outputs the image data or others to the ECU 101 or the HUD apparatus 1.

The camera 2 is an outside camera that is placed at a predetermined position of the vehicle so as to have predetermined orientation and angle of view (FIG. 2). The position of the camera 2 is, for example, vicinity of a front bumper of the vehicle, vicinity of a side of the windshield 9, vicinity of a back mirror on a lateral side of the vehicle or others. The camera 2 captures images in a predetermined direction (image-capturing direction) within a range of a predetermined angle of view so as to include the vehicle and a forward side of the driver, and outputs the image data.

The outside-image capturing unit 102 may include a signal processor that processes the images of the camera 2 or not include it. The signal processor may process the images of one or more cameras 2 to compute and acquire the around-vehicle information or others. The signal processor may be included in the ECU 101 or the HUD apparatus 1. On the basis of the analysis of the images of the camera 2, the outside-image capturing unit 102 may determine states of other cars, people, buildings, road surface, terrain, weather and others around the subject car.

The outside-image capturing unit 102 may have a function of measuring a distance between the subject car and the object of the real image. When two or more cameras such as a stereo camera are included as the camera 2 in the outside-image capturing unit 102, the distance from the object can be computed by using two images captured by the two cameras on right and left sides in a publicly-known distance measuring method based on binocular disparity. Even when only one camera is included in the outside-image capturing unit 102, the distance from the object can be computed on the basis of a position of the object inside the image of the camera. Alternatively, the distance from the object may be computed by combination use of the images of the camera 2 and the detection information of a different sensor.

The image data storage 103 stores the image data output from the camera 2 or others. The image data storage 103 may be set inside the outside-image capturing unit 102 or the HUD apparatus 1.

The communication unit 104 is a unit including a communication interface device that communicates with an external mobile network, the Internet or others. On the basis of the control by the ECU 101, the HUD apparatus 1 or others, the communication unit 104 can communicate with, for example, a server on the Internet or others. For example, the HUD apparatus 1 can refer to and acquire source data, related information and others for use in the AR display from the server through the communication unit 104.

The communication unit 104 may include an inter-car communication wireless receiver, a road-to-car/car-to-road communication wireless receiver, a VICS (Vehicle Information and Communication System: road traffic information communication system, registered trademark) receiver or others. The inter-car communication is communication between the subject car and a surrounding different car. The road-to-car/car-to-road communication is communication between the subject car and surrounding road or apparatus such as a traffic signal.

A GPS receiver 105 acquires current-position information (such as latitude, longitude, and altitude) of the subject car on the basis of signals from a GPS satellite. The ECU 101, the HUD apparatus 1 and the car navigation unit 106 can acquire the current-position information of the subject car from the GPS receiver 105, and use the information for the control.

The car navigation unit 106 is an existing car navigation system unit mounted on a car, and performs a publicly-known navigation processing to store the map information, the position information or others acquired from the GPS receiver 105 and use the information. The ECU 101 and the HUD apparatus 1 can acquire the information from the car navigation unit 106 and perform the control. The HUD apparatus 1 may refer to the map information or others from the car navigation unit 106 and use the information as the source data for the AR display. On the basis of the source data, the HUD apparatus 1 may create, for example, an arrow image as an example of the AR image for use in car navigation toward a destination in the car-running direction.

The sensor 108 has a publicly-known sensor group mounted on a car, and outputs the detection information. The ECU 101 and the HUD apparatus 1 acquires the detection information, and perform the control. Examples of a sensor device in the sensor 108 include a car speedometer, an acceleration sensor, a gyrosensor, a geomagnetic sensor (an electronic compass), an engine start sensor, a shift position sensor, a handle steering angle sensor, a headlight sensor, an external-light sensor (a chromaticity sensor and an illuminance sensor), an infrared sensor (an approaching-object sensor), a temperature sensor and others. The acceleration sensor and the gyrosensor detect an acceleration rate, an angular rate, an angle or others as the state of the subject car.

The sensor 108 may include a distance sensor that measures the distance between the subject car and the object. The distance sensor is achieved by, for example, an optical sensor, and the distance can be computed by using time that is taken while the emitted light impacts against the object and returns to the sensor. In the case with the distance sensor, the information acquiring unit 12 of the HUD apparatus 1 can acquire the distance information from the distance sensor.

The DB unit 109 is configured of a storage or others, and the source data or information to be used for the AR display is stored in a DB. The source data is, for example, basic image data for use in creating the AR image (example: frame image) or others. The information is, for example, basic information or related information of the object (example: oncoming car), a reference image or others. Note that the DB unit 109 may be set inside the HUD apparatus 1 or a data center or others on a communication network out of the on-vehicle system 100. In the DB of the DB unit 109, the information externally acquired through the communication unit 104 may be stored. The DB of the DB unit 109 may be used in combination with the DB of the car navigation unit 106.

The windshield 9 is a part of the car, and is made of a glass having transparency and stiffness, a film having predetermined optical characteristics or others (FIG. 2). In the visual recognition area 5 of the windshield 9, the AR display area 7 is formed at the time of the usage of the AR function so that the virtual image is superimposed on the real image in the AR display area 7. Ahead of the windshield 9, note that an AR-dedicated display plate (such as a combiner) may be arranged. The visual recognition area 5 corresponds to a range in which the AR display area 7 can be arranged by the adjustment.

The image input unit 11 inputs the image captured by the camera 2, and extracts the predetermined object for use in the AR from the image. The information acquiring unit 12 acquires the object information, the distance information, the vehicle information and others as the information that is necessary for the AR display, the display positional conversion and others. The object information is the information containing the position of the object inside the image. The distance information is the information containing the distance between the subject car and the object in a space. The vehicle information is the information containing the car speed or others. The AR image creating unit 13 creates a basic AR image to be superimposed on the object.

The display position converter 14 is, in other words, a correcting unit. The display position converter 14 performs a conversion processing that corrects the position of the AR display area 7 that is the HUD display range in which the AR image is displayable in the visual recognition area 5 and corrects the display position of the AR image in the AR display area 7 by using the information acquired by the information acquiring unit 12. The AR display 15 controls the display 20 so as to superimpose the AR image on the visual recognition area 5 by using the corrected data.

[Driver's Seat]

FIG. 2 schematically shows arrangement examples of units in the first embodiment on a plane on which vicinity of the driver's seat of the car is watched in a lateral direction (X direction). The windshield 9 is put on a front side of the driver's seat, the visual recognition area 5 is set as a part of the windshield, and the AR display area 7 is set as a part of the visual recognition area 5. The display 20 of the HUD apparatus 1, the car navigation unit 106 not illustrated and others are placed at a position of a part of a dashboard on the front side of the driver's seat, such as a position of a console. In FIG. 2, the display element 22 and a mirror 24A of the optical system 24 are shown. The diagram shows a case in which the image light is emitted from the display element 22 to, for example, the front side (a Z direction) and is reflected toward the windshield 9 in an upper direction (a Y direction)

by the mirror 24A. The reflection light from the mirror 24A is reflected on the visual recognition area 5 inside the windshield 9 toward the driver's eyes. Note that the configuration of the optical system 24 is not limited to this, and any configuration is applicable as long as its position and its angle at which the image light (the reflection light of the mirror 24A) is projected onto the visual recognition area 5 are variable.

The driver's eye position and point-of-view position are shown as a point "p1". A line of sight "L1" extending from the point p1 that is the eye position is shown with a chain line. Note that the point-of-view position may be different from the eye position. For example, the point-of-view position may be computed as an intermediate point between both eyes on right and left sides, or be computed as a center point of a head, a face, or others.

The drawing shows a point "p5" indicating positions of the AR display area 7 in the visual recognition area 5 and the virtual image. The point p5 is, for example, a center point of the AR display area 7. The drawing shows a case in which the line of sight L1 of the driver passes the point p5. The point p5 is a cross point with the visual recognition area 5 ahead of the line of sight L1.

The drawing shows a point "p2" of a setting position of and an image-capturing direction "L2" of the camera 2 in the vehicle. In the present example, the camera 2 is set in vicinity of the back mirror on the lateral side of the vehicle. The drawing shows a case in which the image-capturing direction L2 is the Z direction.

An optical axis of the image light is shown with a chain line. In FIG. 2, a range of the image light corresponding to the AR display area 7 is shown. The mirror 24A is arranged as a part of the optical system 24. The mirror 24A is a free curved mirror or others, such as a concave mirror. The mirror 24A has a setting and orientation angle "θ". The mirror 24A can be driven by the driving unit 25 to change the angle θ. The mirror 24A has a rotational axis extending in the X direction (corresponding to a horizontal direction or a right and left direction in the visual recognition area 5). The mirror 24A is rotated around the rotational axis to change the angle θ. The angle θ is a rotational angle on an illustrated Y-Z plane, and is variable within a certain angle range.

In FIG. 2, the angle θ of the mirror 24A is defined as an angle (an elevation angle) of a center axis (shown with a broken line) of a concave surface that is a reflection surface of the mirror 24A from the horizontal surface that is at 0 degree corresponding to an incident direction (Z direction) from the display element 22. In the present example, the angle θ is about 45 degrees. The angle of the mirror 24A for use in the control is not limited to this angle θ, and a different angle may be used. In either way, the projection angle of the reflection light onto the visual recognition area 5 is variable. The reflection angle of the image light on the concave surface and the projection angle onto the visual recognition area 5 can be computed on the basis of the angle θ or others.

On the basis of at least the structure of the mirror 24A having the variable angle θ as described above, the position of the AR display area 7 in the Y direction in the visual recognition area (corresponding to the vertical direction or the up and down direction inside the visual recognition area 5) can be adjusted. That is, particularly in accordance with the angle θ, the position can be adjusted (as a basic setting) so that the AR display area 7 is moved upward and downward inside the visual recognition area 5 when watched from the point of view of the driver.

Also in the X direction, note that a predetermined angle (such as an angle of the rotational axis in the Z direction) of the mirror 24A may be similarly configured to be variable. In this case, the position of the AR display area 7 in the X direction in the visual recognition area 5 can be adjusted. Depending on design of the curved surface of the mirror 24A, a function of coordinate conversion (distortion correction) from an AR flat surface 8 described later to the curved visual recognition area 5 can be also provided.

A positional relation between the camera 2 and the point of view will be described below. In the on-vehicle system 100 and the HUD apparatus 1, the position (point p2) of the camera 2 inside the space is previously set. The point-of-view position (point p1) of the driver is roughly determined as a position within a predetermined range corresponding to the vicinity of the driver's seat. Therefore, the position (point p2) of the camera 2 and the point-of-view position (point p1) roughly have a relation with a certain distance or others as a predetermined relation, and these positions can be exchanged to each other by computation.

[Position and Distance]

Figure 3:
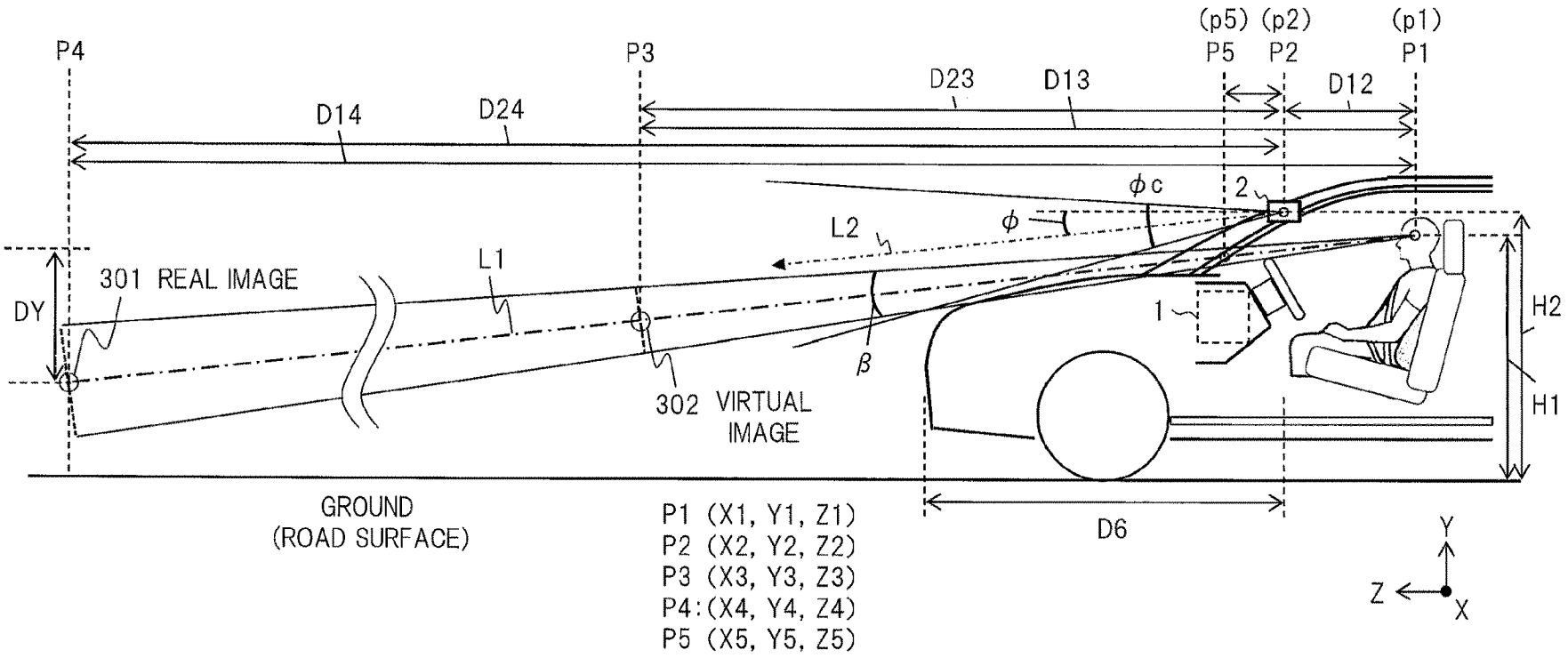
FIG. 3 is a diagram showing a position, a distance, etc., caused when an object and a virtual image ahead of a driver are watched in the first embodiment.

FIG. 3 schematically shows the real image of the object on the ahead road watched from the driver on the driver's seat of the car as similar to FIG. 2, and its position and distance or others at which the virtual image superimposed on the real image is watched therefrom. From the right side of FIG. 3, this drawing shows a point a position "P1" (corresponding to the point p1 of FIG. 2) of the point of view (the eyes) of the driver, a position "P2" (corresponding to the point p2) of the camera 2, a position "P5" (corresponding to the point p5) of the AR display area 7 and the virtual image on the visual recognition area 5, a position "P3" of the AR display area 7 and the virtual image inside the space ahead of the visual recognition area 5, and a position "P4" of the object of the real image ahead of the visual recognition area 5. Each position has positional coordinates inside a three-dimensional space. For example, the position P1 has positional coordinates (X1, Y1, Z1). Similarly, the position P2 having positional coordinates (X2, Y2, Z2), the position P3 having positional coordinates (X3, Y3, Z3), the position P4 having positional coordinates (X4, Y4, Z4), and the position P5 having positional coordinates (X5, Y5, Z5) and others are set.

As shown in FIG. 3, in the computation of the HUD apparatus 1 of the first embodiment, the AR display area 7 and a virtual image 302 are arranged at the position P3 ahead of the visual recognition area 5 so as to correspond to the position P4 of the object of a real image 301 ahead of the visual recognition area 5. In the visual recognition area 5 watched at the point-of-view position of the driver, the AR display area 7 and the virtual image 302 at the position P3 are arranged as the AR display area 7 and the virtual image at the position P5 (the point p5 of FIG. 2). Ahead of the line of sight L1, there is the object (such as an oncoming car or a mark on the road surface) of the real image 301. When the virtual image is superimposed on the object of the real image 301, the virtual image 302 inside the AR display area 7 is computed so as to be displayed ahead of the visual recognition area 5. From the position P1, the virtual image can be watched inside the AR display area 7 at the point p5 of the visual recognition area 5.

A distance between the eye position P1 and the position P2 of the camera 2 is shown as a distance "D12". FIG. 3 particularly shows only a Z-directional distance component. However, there are also an X-directional distance component and a Y-directional distance component. The drawing shows a distance (virtual-image distance) "D13" between the eye position P1 and the position P3 of the virtual image 302 and a distance "D23" between the position P2 of the camera 2 and the position P3 of the virtual image 302. The drawing shows a distance (object distance) "D14" between the eye position P1 and the position P4 of the object of the real image 301 and a distance "D24" between the position P2 of the camera 2 and the position P4 of the object of the real image 301. The drawing shows a distance "D6" between the position P2 of the camera 2 and a front end (the vicinity of the bumper) of the subject car. The drawing also shows a height (a point-of-view height) "H1" of the eye position P1 from ground in the vertical direction (Y direction). The drawing similarly shows a height "H2" of the position P2 of the camera 2.

A position of the subject car is appropriately converted on the basis of the eye position P1, the position P2 of the camera 2, the position P5 of the visual recognition area 5 or others. The Y-directional distance component of the distance of the object (real image 301) from the position of the subject car is shown as a distance "DY".

The drawing shows a case in which the image-capturing direction L2 of the camera 2 is oriented to a slightly lower direction than the horizontal plane. The drawing shows an angle "φ" of the image-capturing direction L2 of the camera 2 with reference to the horizontal direction (Z direction). An image-capturing angle of view of the camera 2 is shown as an angle of view "φc". An angle of view caused when the AR display area 7 is watched from the point-of-view position P1 is shown as an angle of view "β".

As described above, the on-vehicle system 100 and the HUD apparatus 1 have a function of measuring the distance between the subject car and the object by using the outside-image capturing unit 102, the sensor 108 or others. As this distance measuring function, various publicly-known means are applicable. The distance between the subject car and the object is roughly the same as the distance D24 between the position P2 of the camera 2 and the position P4 of the object or the distance D14 between the point-of-view position P1 and the position P4 of the object. A predetermined positional relation is set among the visual recognition area 5 of the windshield 9, the camera 2, the point of view of the driver and others in the subject car, and therefore, various distances among them can be converted to one another on the basis of this relation. For example, when computation is made so as to reflect the distance D12 from the distance D24 between the position P2 of the camera 2 and the object, the distance D14 between the point-of-view position P1 and the object can be obtained. When the distance between the subject car and the object is obtained, the positional information of the object can be also computed with certain accuracy by using the positional information of the subject car based on the GPS.

[Point-of-View Position (1)]

FIGS. 4 to 9 show the point-of-view position and the line of sight of the driver on the driver's seat, change of them and others in the first embodiment and comparative examples.

Figure 4:
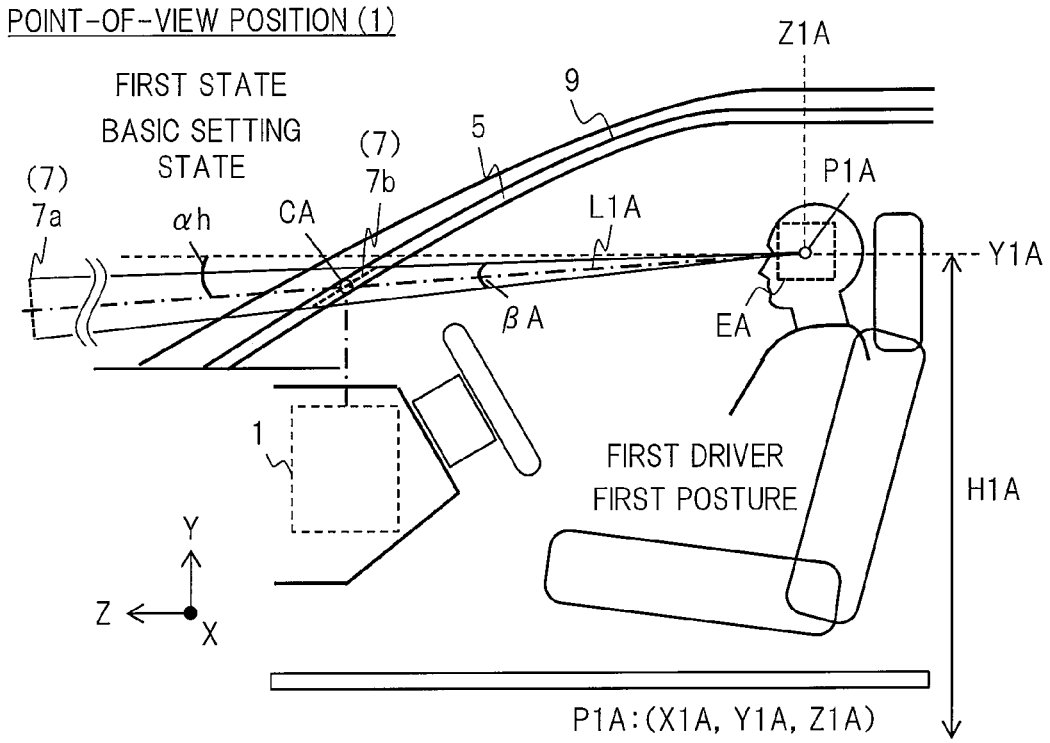
FIG. 4 is a diagram showing a first state of change of a point-of-view position of the driver in the first embodiment.

FIG. 4 shows a first state of the point-of-view position of the driver and others. The first state is a state in which the AR display area 7 is set in the visual recognition area 5 as the basic setting by adjustment of the driver's seat, and then, adjustment of the angle θ of the mirror 24A (not illustrated in FIG. 4) so as to be matched with the point-of-view position in a driver's posture (first posture) by a person having a standard human body size as a first driver.

The drawing shows an eye position "P1A" of the first driver in the first state. The position PIA has positional coordinates (X1A, Y1A, Z1A). The position P1A has a height "H1A" and the position "Y1A" in the Y direction. The position PIA has the position "Z1A" in the Z direction. The drawing also shows an eye box "EA" of the basic setting that centers the position PIA. The drawing shows a line of sight "L1A" from the position PIA.

The AR display area 7 as the basic setting ahead of the visual recognition area 5 is shown by an AR display area "7a" with a broken line. The AR display area 7 inside the corresponding visual recognition area 5 is shown by an AR display area "7b" with a broken line. A point "CA" of the visual recognition area 5 indicates a center point of the AR display area 7a and the AR display area 7b. The line of sight L1A indicates a line of sight caused when the point CA of the AR display area 7 is watched on the line of sight L1A from the position PIA. In this case, the line of sight L1A has an angle of view "βA" of the AR display area 7. The line of sight L1A has an angle "αh" as a depression angle made with a horizontal plane having an angle of 0°. The depression angle is an angle from the horizontal plane, the angle being made when the eyes are watching the virtual image 302 through the visual recognition area 5.

[Point-of-View Position (2)]

Figure 5:
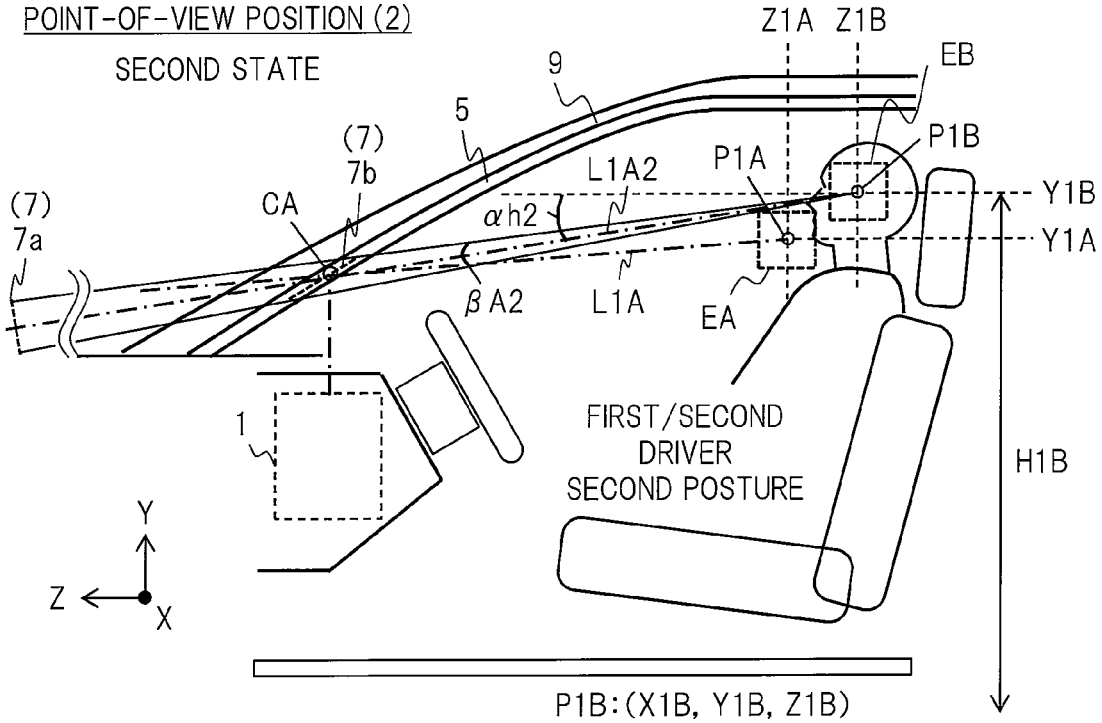
FIG. 5 is a diagram showing a second state of the change of the point-of-view position of the driver in the first embodiment.

As a second state, FIG. 5 shows a case in which the point-of-view position of the driver is different from that of FIG. 4. For the comparison, the drawing also shows the position PTA in the first state and others. The second state indicates, for example, a state with a second posture caused when the same person as the first driver of FIG. 4 changes the driver's seat or his/her posture. Alternatively, the second state indicates, for example, a state with the second posture in a case of a second driver who is different from the first driver of FIG. 4, such as a person having a larger human body size. Particularly, the eye position in the second posture is a position "P1B" that is higher in the Y direction and more backward in the Z direction than those of the position PIA in the first state. The position P1B has positional coordinates (X1B, Y1B, Z1B) and a height "H1B" from the ground. The drawing also shows an eye box "EB" centering the position P1B. The position P1B is a position out of the eye box EA of the position PIA in the first state.

A line of sight "L1A2" indicates a line of sight caused when the point "CA" of the AR display area 7 as the same basic setting as that of FIG. 4 is watched from the eye position P1B in the second state. The line of sight L1A2 has an angle of view "βA2" of the AR display area. The line of sight L1A2 has an angle "αh2" as the depression angle caused when the virtual image is watched.

[Point-of-View Position (3)]

Figure 6:
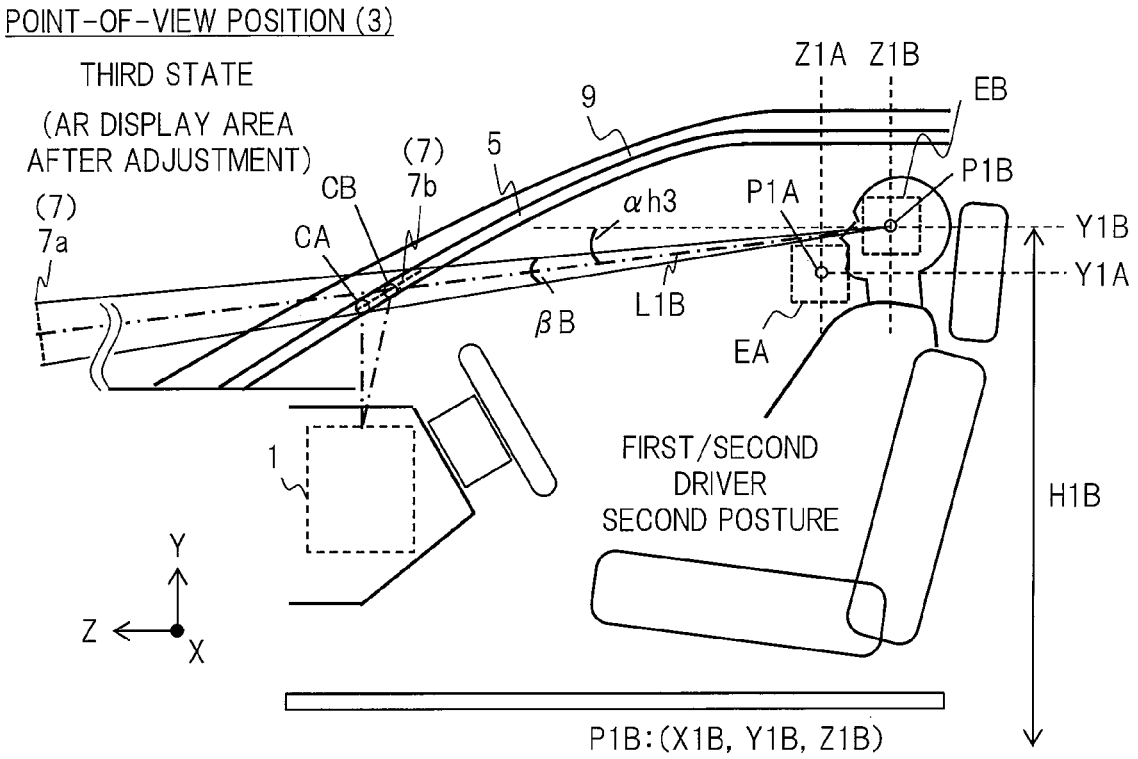
FIG. 6 is a diagram showing a third state of the change of the point-of-view position of the driver in the first embodiment.

As a third state, FIG. 6 shows a case in which the point-of-view position is the same as the point-of-view position P1B in the second posture of the first or second driver of FIG. 5 but the line of sight is different from that. FIG. 6 shows a line of sight "LIB" and others caused when the position of the AR display area 7 is adjusted on the basis of the angle of the mirror 24A (not illustrated in FIG. 6) so as to be matched with the point-of-view position P1B of FIG. 5, and then, when a center point "CB" of the adjusted AR display area 7 is watched from the position P1B. The point CB of the AR display area 7b of the visual recognition area 5 shifts to be upper in the Y direction than the point CA of the AR display area 7b of FIG. 5. The line of sight L1B has an angle of view "βB" of the AR display area 7t. The line of sight L1B has an angle "αh3" as the depression angle.

[Point-of-View Position (4)]

Figure 7:
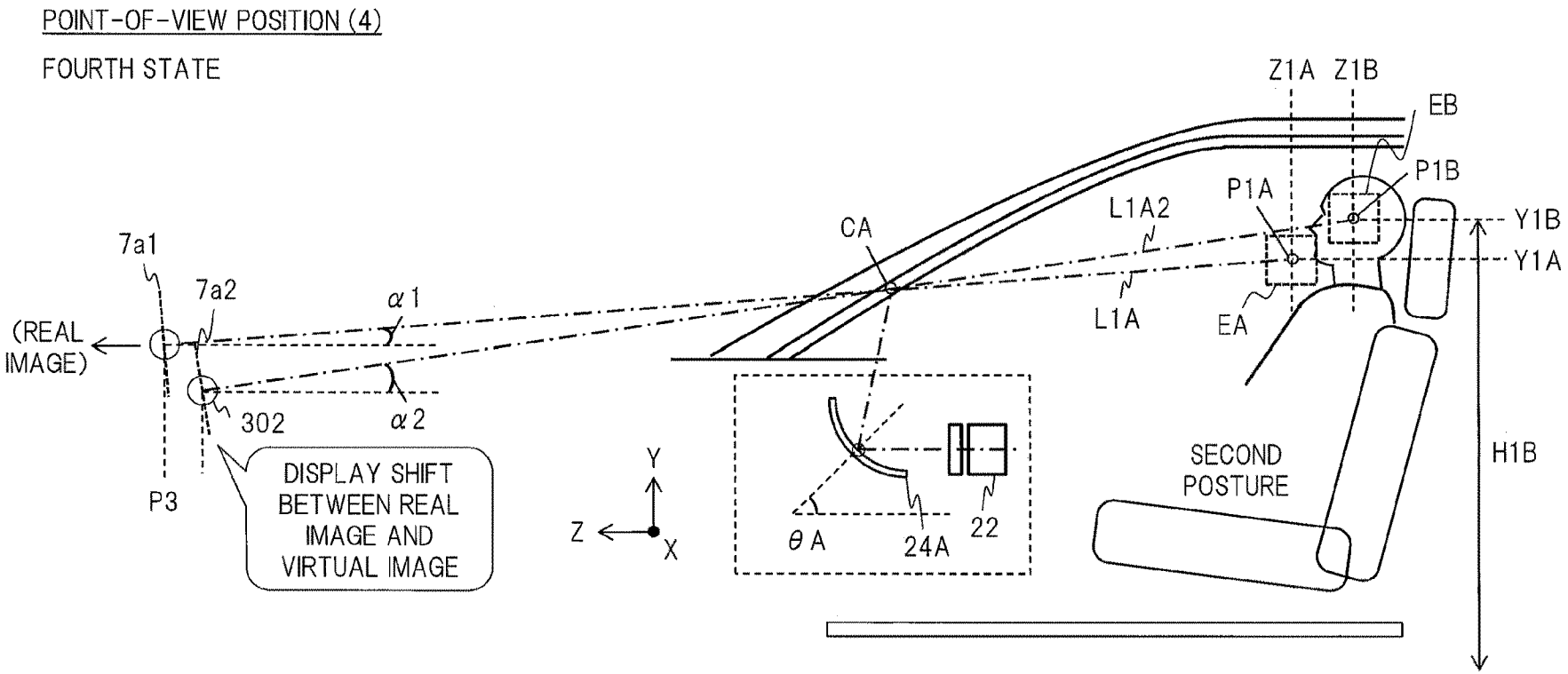
FIG. 7 is a diagram showing a fourth state of the change of the point-of-view position of the driver in the first embodiment.

As a fourth state, FIG. 7 shows a case in which the line of sight L1A caused when the point CA of the AR display area 7 as the basic setting is watched from the point-of-view position PIA in the first state of FIG. 4 is overlapped with the line of sight L1A2 caused when the same point CA of the AR display area 7 is watched from the point-of-view position P1B in the second state of FIG. 5. Also, FIG. 7 shows a state in which the virtual image 302 and the AR display area 7 at the position P3 ahead of the visual recognition area 5 are laterally watched. In this state, a state of the angle θ of the mirror 24A is an angle "θA". In other words, the state of FIG. 7 indicates a case in which the AR display area 7 as the basic setting matched with the point-of-view position P1A of the person in the first state is watched from the point-of-view position P1B of the person in the second state so as to correspond to FIG. 5.

The drawing shows an AR display area 7a1 that can be watched ahead from the position PIA in the first state through the point CA and an AR display area 7a2 that can be watched ahead from the position P1B in the second state through the point CA. In the basic setting state, the AR display area 7 computed by the HUD apparatus 1 is the AR display area 7a1. In the case of the person with the first posture, on the line of sight L1A from the point-of-view position P1A, the object of the real image and the virtual image of the AR display area 7a1 are watched without the display shift. On the other hand, in the case of the person with the second posture after the posture changes, an image that is really watched on the line of sight L1A2 from the point-of-view position P1B is the virtual image of the AR display area 7a2. Therefore, the display shift occurs between the virtual images of the object of the real image ahead of the AR display area 7a1 and the object of the real image ahead of the AR display area 7a2.

An expected angle caused when the AR display area 7 and the virtual image are watched from the point-of-view position is shown as an angle "α". The expected angle is indicated as an elevation angle from the horizontal plane having an angle of 0 degree. The expected angle caused when the virtual image of the AR display area 7a1 is watched on the line of sight L1A through the point CA from the position P1A is an angle "α1". The expected angle caused when the virtual image of the AR display area 7a2 is watched on the line of sight L1A2 through the same point CA from the position P1B is an angle "α2". The angle α1 and the angle α2 are different from each other. The expected angle from the point-of-view position in the second state is larger than the expected angle from the point-of-view position in the first state (α1<α2). Note that the expected angle and the depression angle have a correspondence relation. In this manner, the display shift occurs between the real image and the virtual image in accordance with the change of the point-of-view position, the expected angle of the line of sight, or others. In the fourth state, the virtual image inside the AR display area 7 is difficult to be visually recognized or is hardly visually recognized from the point-of-view position P1B of the driver with the second posture.

[Point-of-View Position (5)]

Figure 8:
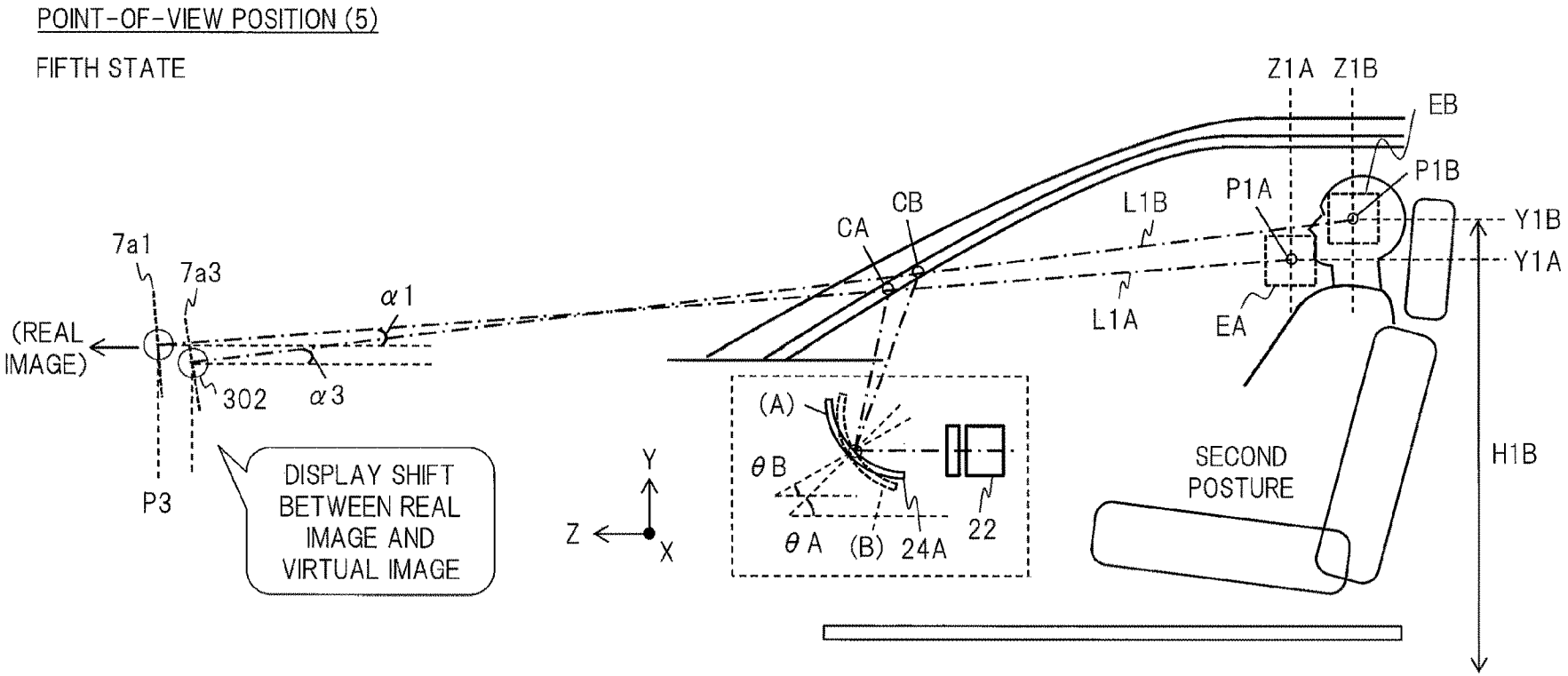
FIG. 8 is a diagram showing a fifth state of the change of the point-of-view position of the driver in the first embodiment.

As a fifth state, FIG. 8 shows a state in which the line of sight L1A caused when the point CA of the AR display area 7 as the basic setting is watched from the point-of-view position PIA in the first state of FIG. 4 is overlapped with the line of sight LIB caused when the point CB of the adjusted AR display area 7 is watched from the point-of-view position P1B in the third state of FIG. 6. FIG. 8 similarly shows a state in which the virtual image 302 and the AR display area 7 at the position P3 ahead of the visual recognition area 5 are laterally watched. In this state, the state of the angle θ of the mirror 24A changes from the angle θA to the angle θB by the adjustment. The state of FIG. 8 shows, in other words, a case in which the AR display area 7 matched with the point of view of the person in the second state is watched from the point of view P1B of the person in the second state so as to correspond to FIG. 6.

The drawing shows the AR display area 7a1 that can be watched ahead from the position PIA in the first state through the point CA and an AR display area 7a3 that can be watched ahead from the position P1B in the second state through the point CB. In the case of the person with the second posture after the adjustment and the posture change, an image that is really watched on the line of sight L1B from the point-of-view position P1B is the virtual image of the AR display area 7a3. Therefore, in the field of view of the person, the display shift occurs between the object of the real image ahead of the AR display area 7a1 and the virtual image of the AR display area 7a3.

A depression angle caused when the virtual image of the AR display area 7a3 is watched on the line of sight L1B through the point CB from the position P1B is shown as an angle "α3". Because of the adjustment, the angle α3 is smaller than the angle α2. Therefore, the display shift between the real image and the virtual image is smaller than that in the case of the fourth state of FIG. 7, but still exists. That is, the virtual image of the AR display area 7 is difficult to be visually recognized from the point-of-view position P1B of the person with the second posture.

Conventionally, also when the angle θ of the mirror 24A is readjusted so as to change the state from the state of FIG. 7 to the state of FIG. 8, the virtual image of the AR display area 7 is difficult to be visually recognized from the point-of-view position P1B of the driver with the second posture, and therefore, the adjustment operation is also difficult. For example, it is assumed that the second driver who is the person having the larger human body size attempts the readjustment of the AR display area 7 so as to be matched with the point-of-view position P1B caused after the adjustment of the driver's seat. At this time, as the virtual image on the visual recognition area 5, the HUD apparatus 1 displays the image (such as an image, a predetermined mark or others indicating a frame of the AR display area 7) to be a guidance for the setting and the adjustment of the AR display area 7. At this time, when the driver slightly changes the angle θ of the mirror 24A by the manual operation, the position of the AR display area 7 in the visual recognition area 5 relatively largely changes. In this manner, the changed AR display area 7 is out of the visual recognition area 5 in some cases, and therefore, the adjustment is difficult. Even if the AR display area 7 can be adjusted to the point CB in the visual recognition area 5, there are problems for the visual recognition of the virtual image since the display shift still exists as described above.

In the HUD apparatus of the comparative example of the first embodiment, in FIG. 3, an angle of view "φc" of the camera 2 and the angle of view "β" of the AR display area 7 are different from each other. A height "H1" of the point-of-view position P1 or others and a height "H2" of the position P2 of the camera 2 or others are different from each other. Therefore, the HUD apparatus of the comparative example causes the display shift between the real image and the virtual image. Accordingly, the HUD apparatus 1 of the first embodiment has such an automatic correcting function as matching these angles of view and positions with each other. The HUD apparatus 1 of the first embodiment performs the conversion processing that automatically corrects the position of the AR display area 7 in the visual recognition area 5 by using the processing of the controller 10 on the basis of the image captured by the camera 2. In the conversion processing, on the basis of the object position and distance inside the image, the position of the AR display area 7 ahead of the visual recognition area 5 and the display position of the AR image inside the AR display area 7 are computed. In this manner, the favorable AR display without the display shift or with the reduced display shift between the real image and the virtual image is achieved.

[Point-of-View Position (6)]

Figure 9:
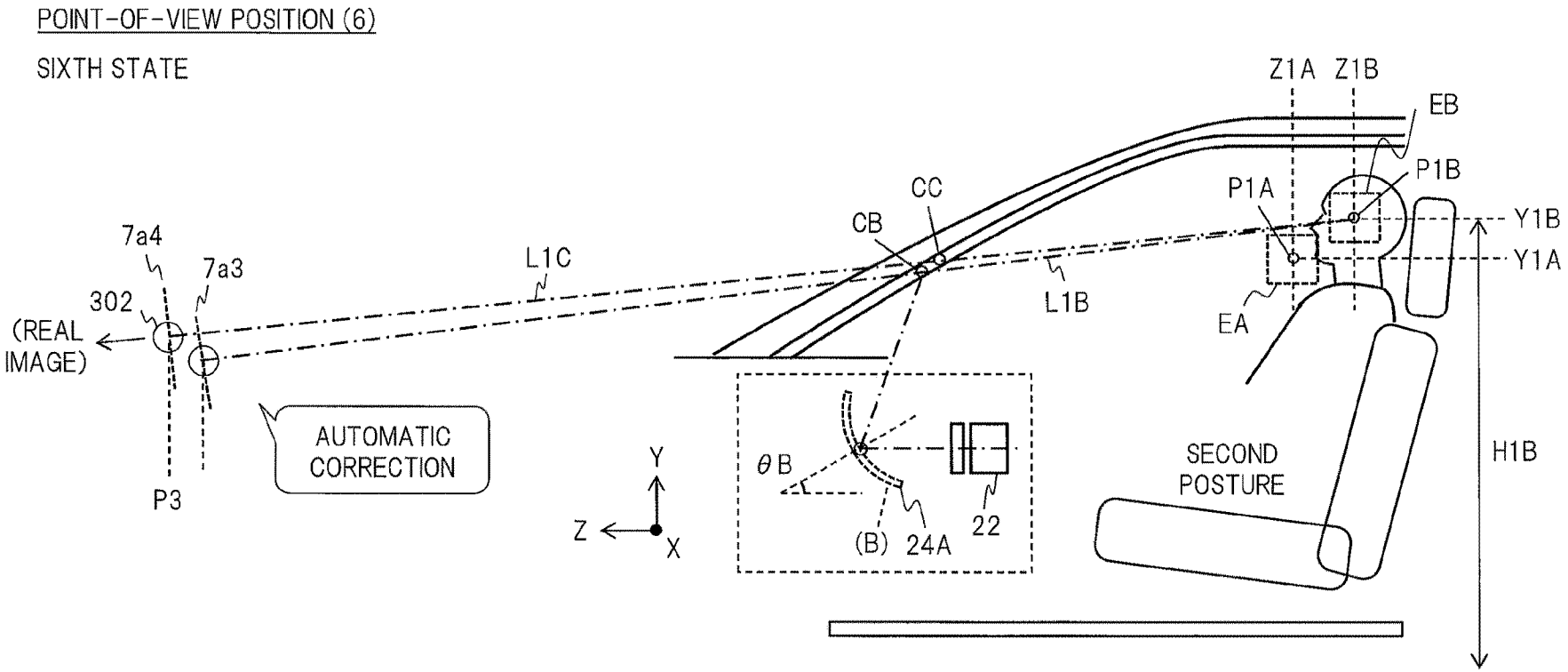
FIG. 9 is a diagram showing a sixth state of the change of the point-of-view position of the driver in the first embodiment.

As a sixth state, FIG. 9 shows a state in which the position of the AR display area 7 and the display position of the AR image inside the AR display area 7 are corrected by the automatic correction of the first embodiment so as to correspond to the states of FIGS. 7 and 8. The state of the angle θ of the mirror 24A is the angle θB that is the same as the angle of FIG. 8. In the corrected state, the virtual image of the AR display area 7a3 watched ahead of the line of sight LIB from the point-of-view position P1B is recognized as a virtual image of an AR display area 7a4 ahead of a line of sight "L1C" from the point-of-view position P1B. Because of the conversion, the AR display area 7 changes from the AR display area 7a3 before the correction to the corrected AR display area 7a4. The line of sight L1C is a line of sight caused when the virtual image of the AR display area 7a4 is watched from the point-of-view position P1B through a center point "CC" of the corrected AR display area 7. In this manner, when the AR display area 7 is watched from the point-of-view position P1B of the driver with the second posture, the display shift between the real image and the virtual image does not occur or is reduced.

[Process Flow]

Figure 10:
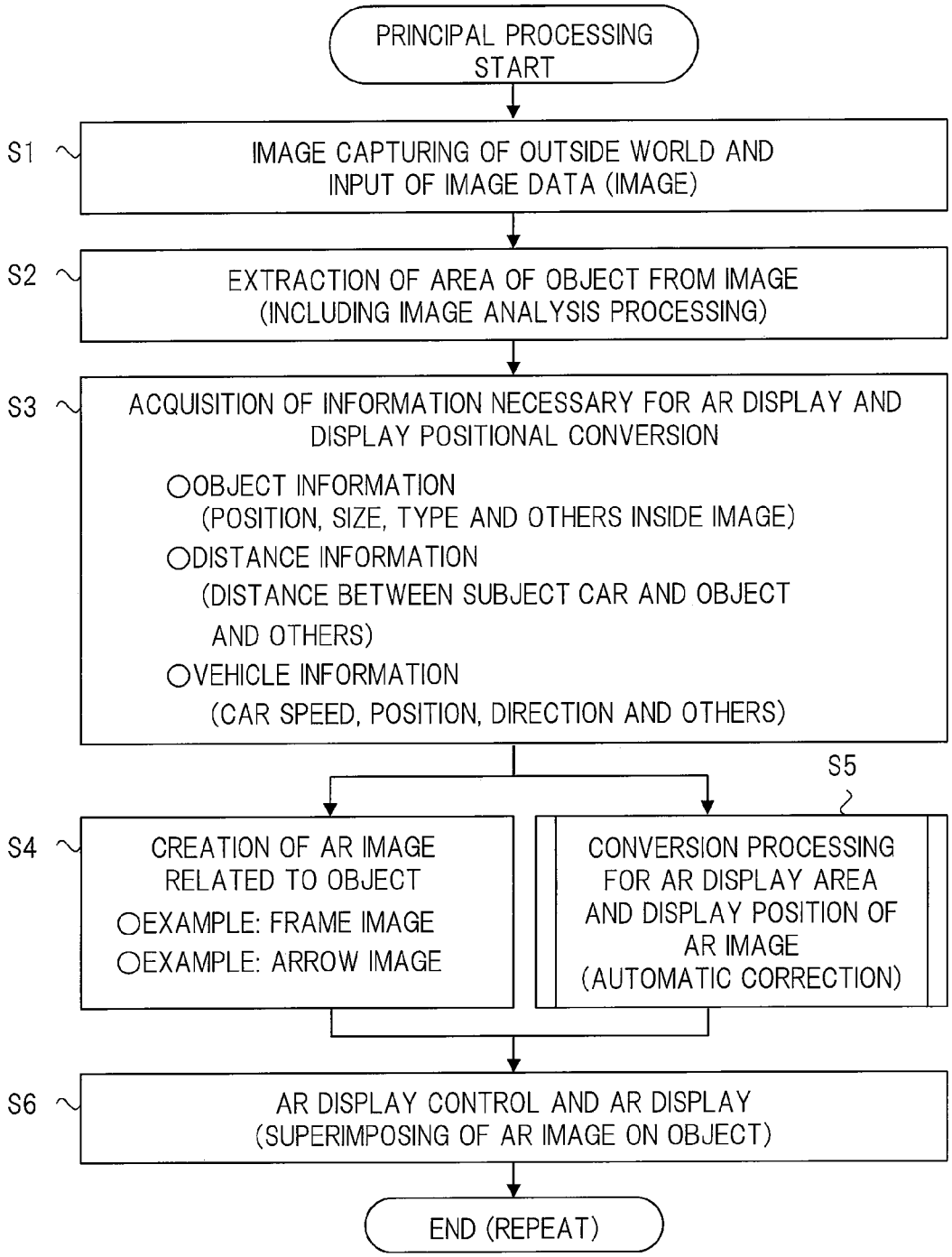
FIG. 10 is a diagram showing a flow of a principal processing of a controller in the first embodiment.

FIG. 10 shows a flow of a principal processing of the controller 10 of the HUD apparatus 1. This processing includes the conversion processing for the position of the AR display area 7. The controller 10 performs such a processing in real time during the running of the subject car and the usage of the AR function. FIG. 10 includes steps S1 to S6. The flow will be described below in an order of the steps.

(S1) The image input unit 11 of the controller 10, for example, reads and sequentially inputs the image frame of the image data of the camera 2 of the outside-image capturing unit 102 from the image data storage 103.

(S2) The image input unit 11 performs a processing of extracting an area, a position or others of a predetermined object for the AR from the input image. The predetermined object is, for example, an oncoming car, a pedestrian, a bicycle, etc., to be a display target as the AR image, or a traffic lane or mark on a road surface, a road side strip, a building, a traffic sign, etc., to be needed for the AR control. Note that this extraction processing is achieved by a publicly-known technique including feature extraction and image analysis such as image matching.

(S3) For the input image and the extracted object in S1, the information acquiring unit 12 acquires predetermined information that is necessary for the AR image creation and the conversion for the position of the AR display area 7. The predetermined information contains the object information, the distance information, the vehicle information and others.

The information acquiring unit 12 acquires the object information as described below. The information acquiring unit 12 acquires information such as a position, a size and a shape of an object area in the image, a type (such as an oncoming car, people, a bicycle, a road surface, or a traffic sign) of the determined object or others as extraction result information of the object from the image of S1. Alternatively, the information acquiring unit 12 may refer to and acquire the previously-registered object information from the car navigation unit 160 or the DB of the DB unit 109.

The information acquiring unit 12 acquires the distance information as described below. The information acquiring unit 12 acquires the distance information containing, for example, the distance between the subject car and the object from the outside-image capturing unit 102 or the sensor 108. For example, when the outside-image capturing unit 102 has a distance measuring function, the information acquiring unit 12 acquires the distance information from the outside-image capturing unit 102. When the sensor 108 has a distance sensor, the information acquiring unit acquires the distance information from the sensor 108. Alternatively, the information acquiring unit 12 computes the distance by using the image or the information acquired from the image input unit 11 or the sensor 108.

The information acquiring unit 12 acquires the vehicle information as described below. The information acquiring unit 12 acquires the vehicle information containing, for example, the car-running information from the ECU 101 or the sensor 108. The car-running information contains, for example, information indicating a state such as right turn, left turn, going straight or others. The ECU 101 gets the vehicle information containing the car speed of the subject car and others on the basis of the sensor 108. The information acquiring unit 12 acquires the vehicle information from the ECU 101. The information acquiring unit 12 acquires, for example, the current-position information, the car-running direction information of the subject car or others from the sensor 108, the GPS receiver 105 or the car navigation unit 106. The information acquiring unit 12 may acquire the navigation information from the car navigation unit 106. The information acquiring unit 12 may acquire the inter-car communication information, the road-to-car/car-to-road communication information, or the VICS information from outside through the communication unit 104.

Figure 11:
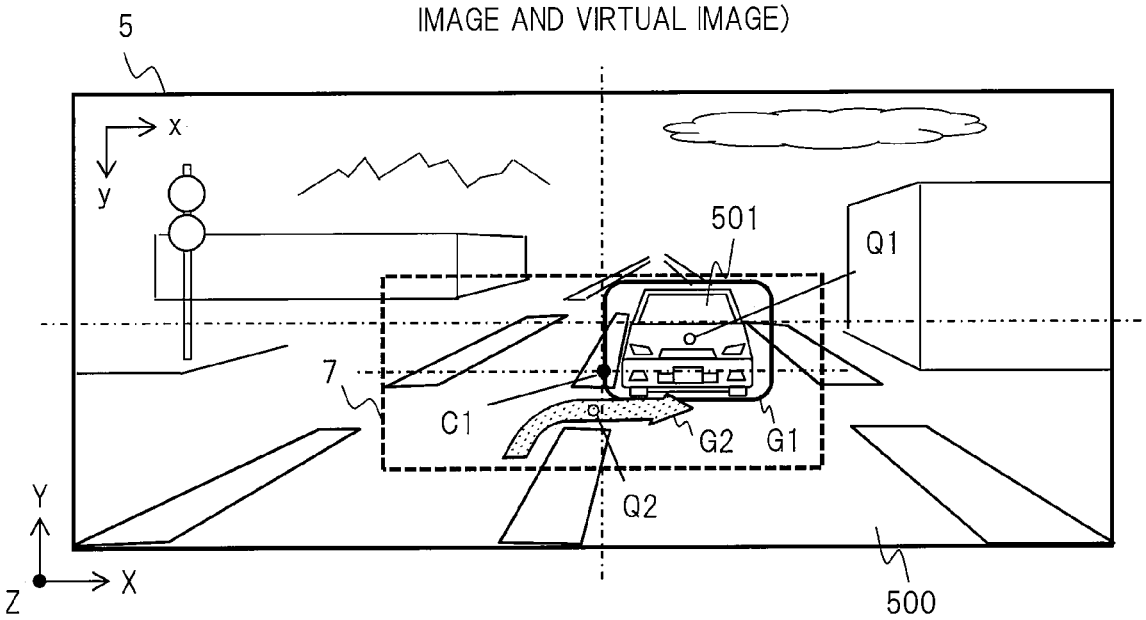
FIG. 11 is a diagram showing a state without display shift as an example of a visual recognition area watched from the driver in the first embodiment.

(S4) The AR image creating unit 13 creates the basic AR image to be linked with and superimposed on a target object on the basis of the image or the information of S1 to S3. At this time, the AR image creating unit 13 may receive the source data as input from the car navigation unit 106, the ECU 101, the DB unit 109 or others, and use the data in order to create the AR image. As the source data, for example, the map information of the car navigation unit 106, the information of the subject car related to the current-position information, the destination and the route, the vehicle information of the ECU 101, the object information inside the DB and others are cited. These types of information depend on which type of the image information the AR function provides, and are not particularly limited. In the present example, as shown in FIG. 11 described later, at least the frame image of the oncoming car, the arrow image of the navigation or others is provided as the AR image, and therefore, the source data for such an AR image is prepared. The AR image creating unit 13 outputs the created AR image.

(S5) Meanwhile, on the basis of the information of S1 to S3 and the AR image data of S4, the display position converter 14 performs a conversion processing for the automatic correction and the determination of the position of the AR display area 7 in the visual recognition area 5 and the display position of the AR image inside the AR display area 7. This correction is correction for the display shift between the real image and the virtual image, in other words, correction for the positional shift of the AR display area 7 in the visual recognition area 5. The display position converter 14 arranges the AR image inside the converted AR display area 7. That is, the display position converter 14 determines the display position of the AR image inside the converted AR display area 7.

The display position converter 14 determines the position of the converted AR display area 7 and the display position of the AR image inside the converted AR display area 7 by performing the conversion processing based on a predetermined conversion table (or a predetermined conversion computational expression).

(S6) On the basis of the data and the information of S4 and S5, the AR display 15 performs a control processing for displaying the AR image on the AR display area 7 in the visual recognition area 5, and causes the display 20 to perform the AR display. On the computational AR flat surface 8 linked with the visual recognition area 5, the AR display 15 creates the AR data for use in displaying the AR image in the AR display area 7 by using the converted (corrected) data of S5. At this time, the AR display 15 performs a coordinate conversion (distortion correction) processing for linking the AR flat surface 8 with the curved visual recognition area 5 of the windshield 9. The AR display 15 supplies the image data that is the created AR data to the display 20. Then, as described above, the display driving circuit 21 creates the display driving signal in accordance with the AR data, and drives the optical source 23 and the display element 22. In this manner, the image light from the display element 22 is projected and reflected on the AR display area 7 in the visual recognition area 5 through the mirror 24A of the optical system 24 or others, so that the AR image is superimposed on the object of the real image. The principal processing is repeated as described above. The conversion processing for the position of the AR display area 7 or others will be described below with reference to a specific example.

[Visual Recognition Area (1)]

FIG. 11 shows an example of the AR image and the AR display area 7 in the visual recognition area 5 of the windshield 9 watched from the point-of-view position of the driver. FIG. 11 shows the case without the display shift between the real image and the virtual image. In FIG. 11 and others, note that the visual recognition area 5 is simply shown as a rectangular X-Y plane. Inside the visual recognition area 5, a road 500, an oncoming car 501, buildings, sky and others ahead of the subject car are visually recognized as the real image. The positional example of the AR display area 7 in the visual recognition area 5 is shown by a broken-line frame. This broken-line frame is not practically displayed. The present example shows that the rectangular AR display area 7 having a relatively small size is set in vicinity of the center of the visual recognition area 5. However, the setting is not limited to this, and any setting is applicable. A point "C1" indicates a center position of the AR display area 7.

Inside the AR display area 7, the AR image is displayed if needed. As the examples of the AR image, the drawing shows AR images "G1" and "G2". The AR image G1 is a display example of such a frame image as surrounding an area of the oncoming car 501 in order to emphasize existence of the oncoming car 501. The AR image G1 can encourage the driver to pay attention. The AR image G1 is displayable in accordance with the detection of the oncoming car from the image of the camera 2. The display of the AR image G1 can be controlled on the basis of, for example, the vehicle information from the ECU 101. For example, whether to display the AR image G1, a display color, whether to turn on/off the display or others may be controlled on the basis of the car speed of the subject car and decision on the distance from the oncoming car 501. The AR image G2 is a display example of an arrow image for use in navigation in the car-running direction for the subject car on the road surface of the road 500 ahead of the subject car. The AR image G2 is an arrow image indicating, for example, the right turn. The AR image G2 is created and displayed on the basis of, for example, the information related to the destination and the route in the car navigation unit 106. Note that the contents and the display method of the AR image as described above are one example, and are not limited.

A point "Q1" indicates a center position of the area of the oncoming car 501 that is the object inside the visual recognition area 5 and inside the image of the camera 2. A display center position of the AR image G1 is the point Q1. A point "Q2" is one position (such as inside of a traffic intersection) on the road 500. A display center position of the AR image G2 is the point Q2.

As shown in FIG. 3 and others, the position of the camera 2 and the point-of-view position of the driver are different from each other, and therefore, the content of the image captured by the camera 2 is different from the content of the visual recognition area 5 of the field of view of the driver but is nearly a linked content. The controller 10 links the image of the camera 2 to the visual recognition area 5 by computing the correction for the difference (the distance D12) between the position of the camera 2 and the point-of-view position of the driver. Note that it is assumed below that the visual recognition area 5 and an image 6 are almost the same as each other for simple explanation. In other words, the drawing shows a case in an assumption that the position P2 of the camera 2 matches the position of the subject car and the point-of-view position. Although such positional relation has various cases, the cases are mutually exchangeable as described above. The position of the subject car is a position of any previously-set point in the area of the subject car, such as a position "M1" of the subject car in FIG. 15 that is a center point of the windshield 9 or others.

Note that the display example of the AR image in FIG. 11 shows a case of a method of setting the position of the object of the real image as the same as the display position of the AR image. However, the display example is not limited to this, and any display example is applicable. As a different method, a method of linking the AR image with a drawing line or others to a position near the object position for the display or others is also applicable.

[Visual Recognition Area (2)]

Figure 12:
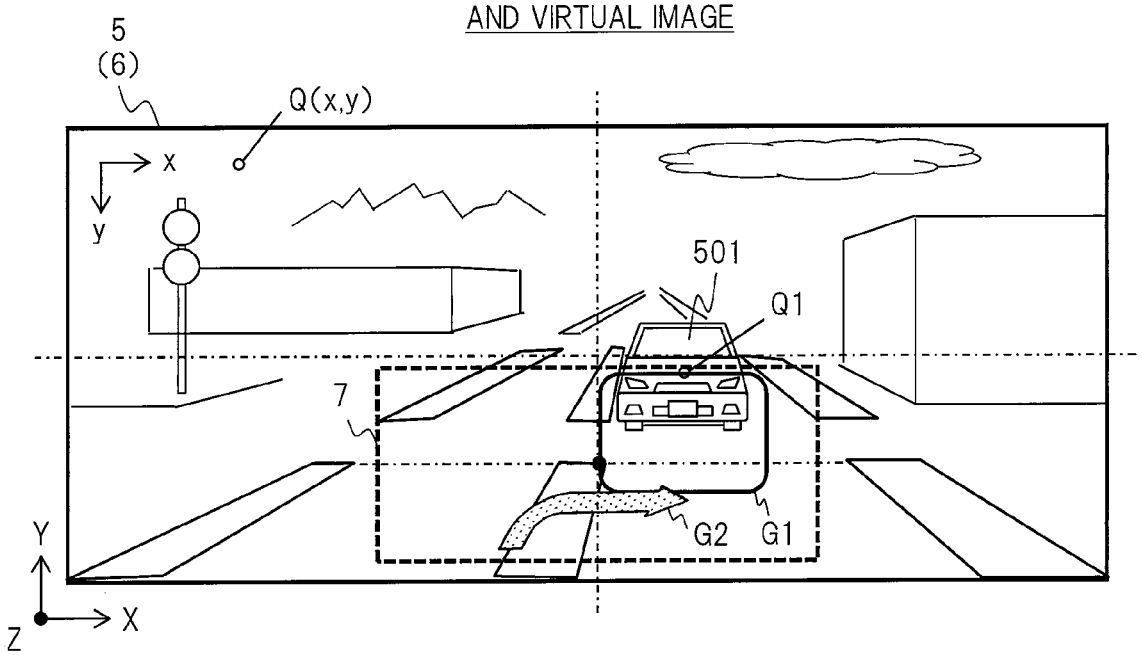
FIG. 12 is a diagram showing a first example of a state with the display shift as the example of the visual recognition area watched from the driver in the first embodiment.

FIG. 12 shows an example of the visual recognition area 5 of the field of view of the driver and the linked image 6 of the camera 2. The example of FIG. 12 shows a case in which the AR display area 7 is set inside the visual recognition area 5 while the display shift between the real image and the virtual image occurs. This case corresponds to the cases of FIGS. 7 and 8. As a two-dimensional coordinate system of the image 6 of the camera 2, a coordinate value in a lateral direction (an in-plane horizontal direction) is indicated as a small letter "x", and a coordinate value in a longitudinal direction (an in-plane vertical direction) is indicated as a small letter "y". Positional coordinates of a point "Q" of a pixel inside the image 6 is indicated as "(x, y)".

In a state of FIG. 12, the positions of the AR display area 7 and the AR images G1 and G2 shift downward from the position (point Q1) of the oncoming car 501 inside the visual recognition area 5 and the image 6 in the state of FIG. 11. For example, the frame image that is the AR image G1 shifts from the area of the oncoming car 501 so as to partially overlap the area of the oncoming car 501 but not surround the area of the oncoming car 501. When a degree of the display shift is a certain value or smaller, the driver can recognize the linkage between the oncoming car 501 and the AR image G1. However, the larger the display shift degree is, the more unsuitable the AR image is.

[Visual Recognition Area (3)]

Figure 13:
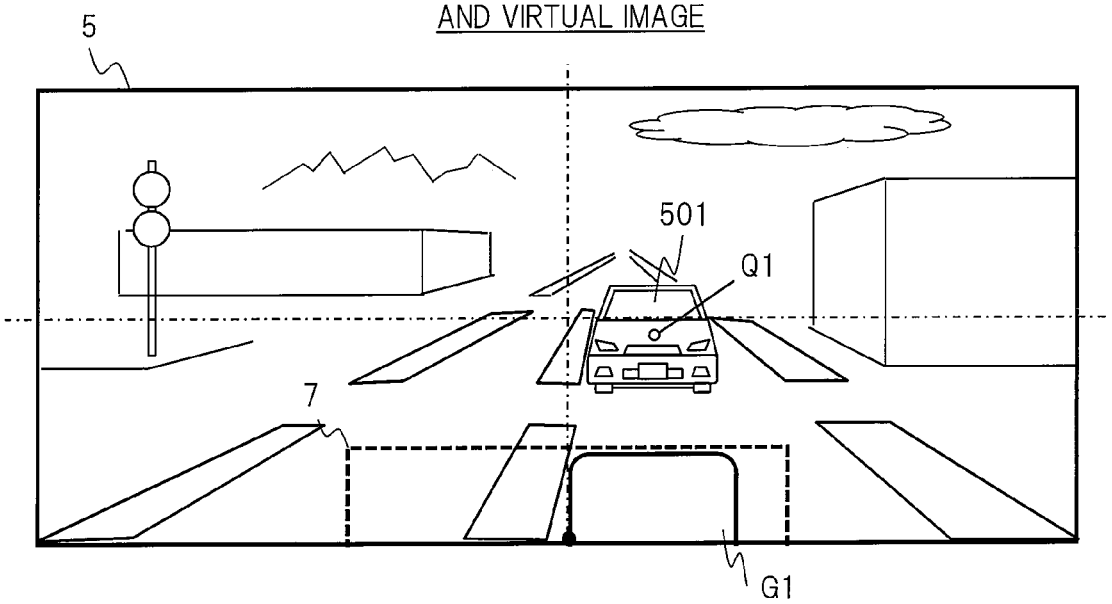
FIG. 13 is a diagram showing a second example of the state with the display shift as the example of the visual recognition area watched from the driver in the first embodiment.

FIG. 13 shows a case in which a part of the AR display area 7 is out of the visual recognition area 5 as another example of the visual recognition area 5. For example, when the angle θ of the mirror 24A is adjusted so as to change from the above-described state of FIG. 7 to the state of FIG. 8, a state as shown in FIG. 13 is caused in some cases because this is not adjusted well. In the state of FIG. 13, the display shift is large, and therefore, the AR image is unsuitable. The AR image G1 is cut, and only a part of this is displayed, and therefore, is difficult to be visually recognized, and the linkage between the AR image and the oncoming car 501 cannot be recognized. The AR image G2 cannot be totally watched. The driver is more difficult to recognize the linkage between the real image and the virtual image as the display shift between the real image and the virtual image is larger. Such display shift is desirable to be as small as possible.

[Camera Image]

Figure 14:
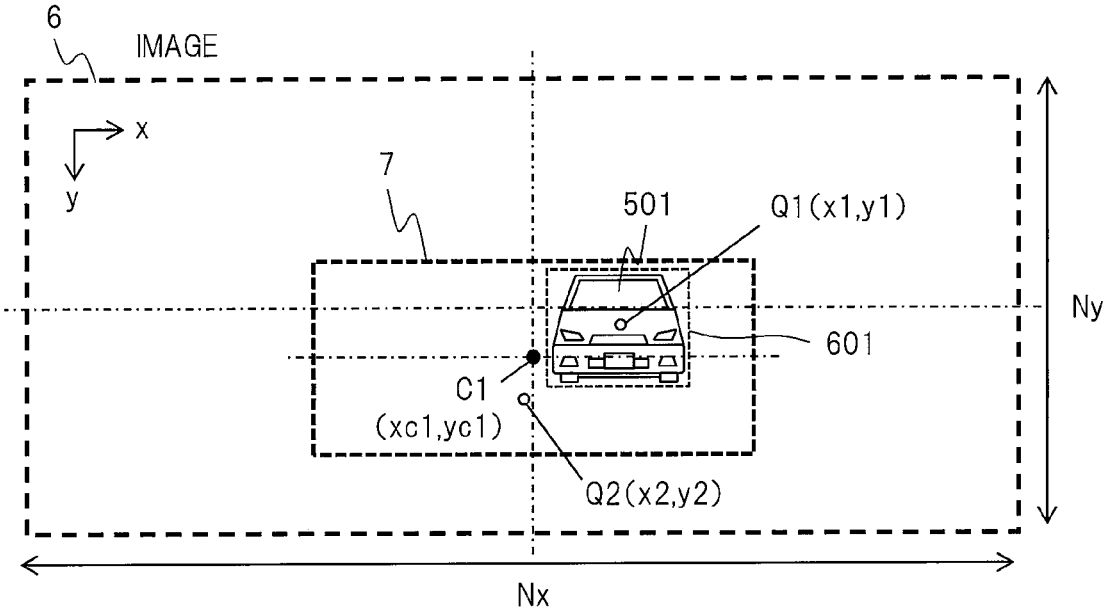
FIG. 14 is a diagram showing an example of a camera image in the first embodiment.

FIG. 14 shows an example of the image 6 of the camera 2 corresponding to FIG. 11 and others, and particularly schematically shows a case in which the area of the oncoming car 501 is extracted from the image 6. On the basis of the image analysis such as the feature extraction, from the image 6 of the camera 2, the image input unit 11 detects the area and the positional coordinates of the predetermined object that is the AR target included in the AR display area. In the present example, the oncoming car 501 of FIG. 11 is the target object. The image input unit 11 detects positional coordinates (x1, y1) of the center point Q1 of the object, and extracts an area 601 centering the point Q1. The area 601 simply has a quadrangular shape surrounding the area of the oncoming car 501 in the example. However, the shape is not limited to this, and any shape is applicable. The image input unit 11 may detect the target object area as an area having a trapezoidal shape, an elliptic shape or others, or may more specifically detect a pixel area, a shape or others. When the object area of the image input unit 11 is extracted, note that the area can be detected by using a publicly-known method on the basis of the previously-set object feature information or definition information, a basic image, or others.

The AR display area 7 inside the image 6 indicates a position linked with the position of the AR display area 7 inside the visual recognition area 5 in the basic setting example. A center point "C1" of the AR display area 7 has positional coordinates (xc1, yc1) inside the image 6.

Similarly, when the traffic intersection on the road surface of the road 500 ahead of the subject car or others is set as the target object, one representative position of the object area is indicated by positional coordinates (x2, y2) of a point "Q2". The image input unit 11 detects the point Q2 of the area of the traffic intersection or others.

[Distance from Object]

Figure 15:
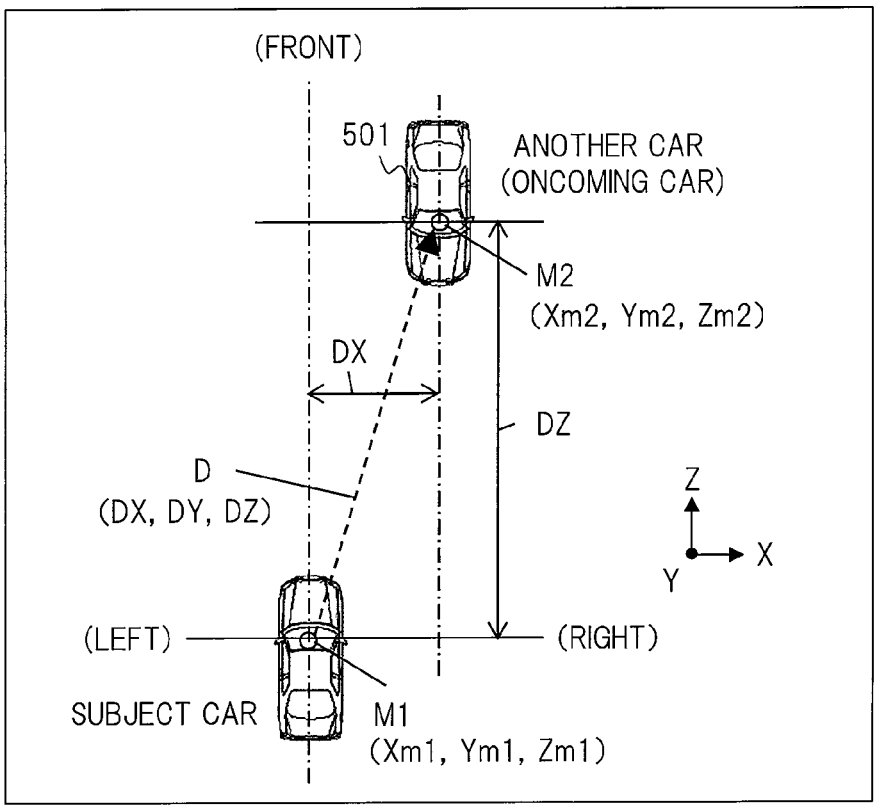
FIG. 15 is a diagram showing a distance between a subject car and a different car in a space in the first embodiment.

FIG. 15 shows a positional relation and a distance between the subject car and a different car on a horizontal plane (X-Z plane) of a third-dimensional space. The different car is the AR target object such as the oncoming car 501. A position of the subject car is set as "M1", and positional coordinates of the position is indicated as (Xm1, Ym1, Zm1). A position of the different car is set as "M2", and positional coordinates of the position is indicated as (Xm2, Ym2, Zm2). Note that the positional coordinates of each of the subject car and the different car correspond to positional coordinates (latitude, longitude, altitude or others) based on the GPS. The drawing shows a case in which each position of the subject car and the different car is set to a position in vicinity of the center of the windshield. As described above, a predetermined positional relation is made among the visual recognition area 5 of the windshield 9 of the subject car, the point-of-view position of the driver, the position of the camera 2 and others, and they are mutually exchangeable.

A distance between the position M1 of the subject car and the position M2 of the different car in the space is indicated as a distance "D". A distance between the position M1 of the subject car and the position M2 of the different car in the Z direction corresponding to the front side direction of the subject car in the distance D is indicated as a distance "DZ". A distance (gap) between the position M1 of the subject car and the position M2 of the different car in the X direction corresponding to the right and left direction of the subject car in the distance D is indicated as a distance "DX". Although not illustrated, a distance component (corresponding to a distance "DY" of FIG. 3) also exists in a height direction (Y direction). The distance DZ corresponds to the distance "D14" or the distance "D24" in FIG. 3.

The HUD apparatus 1 measures the distance between the position M1 of the subject car and the position M2 of the different car (the oncoming car 501) by using a predetermined method. For example, when a stereo camera of the above-described outside-image capturing unit 102 is used, the distance D can be computed by using a binocular parallax system on the basis of the positional coordinates (x, y) of the object (the different car) inside each of two right and left images.

[AR Flat Surface (1)]

Figure 16:
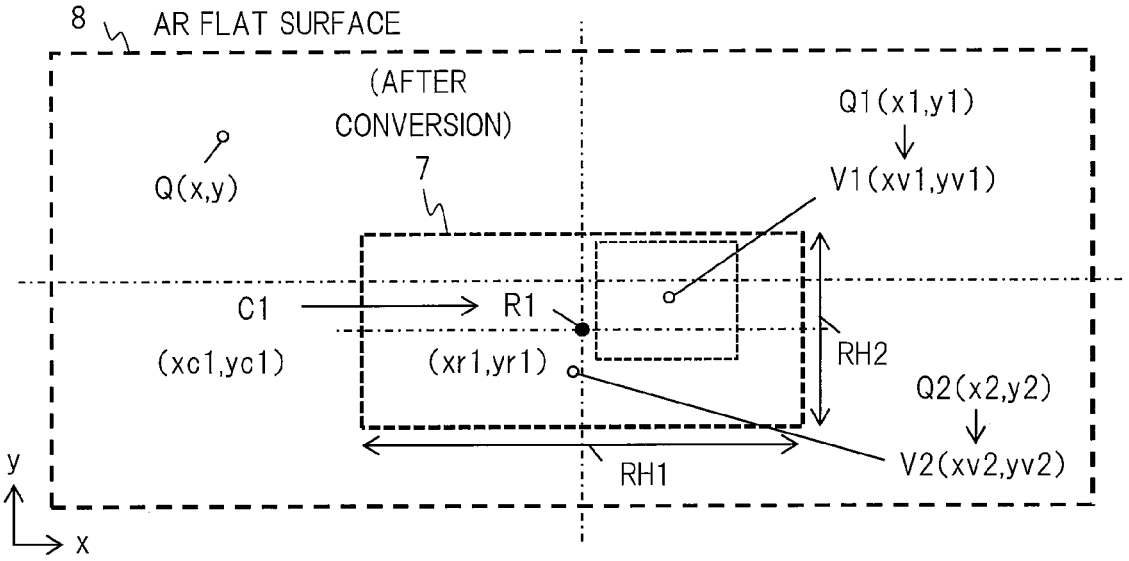
FIG. 16 is a diagram showing an AR flat surface and an AR display area caused after conversion in the first embodiment.

FIG. 16 shows an AR flat surface 8 that is a two-dimensional plane computed by the AR function of the HUD apparatus 1. The AR flat surface 8 is configured so as to be linked with the visual recognition area 5 and the image 6. The AR flat surface 8 is a flat surface in a state before the AR image is displayed in the AR display area 7 of the practically-curved visual recognition area 5. In the AR flat surface 8, as similar to the image 6, a component on a horizontal axis is indicated as a small letter "x", a component on a vertical axis is indicated as a small letter "y", and the positional coordinates of the point Q1 is indicated as (x, y).

The display position converter 14 performs the conversion processing for the AR display area 7 and the AR image on the AR flat surface 8. The display position converter 14 determines the converted AR display area 7 by the conversion processing on the basis of the AR display area 7 before the conversion, and arranges the converted AR display area 7 on the AR flat surface 8. A center point of the converted AR display area 7 is indicated by positional coordinates (xr1, yr1) of a point "R1". The AR display area 7 also has a lateral width "RH1" and a longitudinal width "RH2" based on the setting.

The display position converter 14 acquires the display position of the AR image inside the AR display area 7 on the AR flat surface 8 by a predetermined conversion processing using the object information (the positional coordinates of the object of FIG. 14) and the distance information (the distance D of FIG. 15) supplied from the information acquiring unit 12. The display position of the AR image on the AR flat surface 8 is indicated by positional coordinates (x, y) of a point "V". The point V is a reference point (such as a center point) for use in the arrangement of the AR image. For example, positional coordinates (xv1, yv1) of a point "V1" linked with the positional coordinates (x1, y1) of the point Q1 in the area of the oncoming car 501 are determined. And, positional coordinates (xv2, yv2) of a point "V2" linked with the positional coordinates (x2, y2) of the point Q2 on the road are determined.

Figure 17:
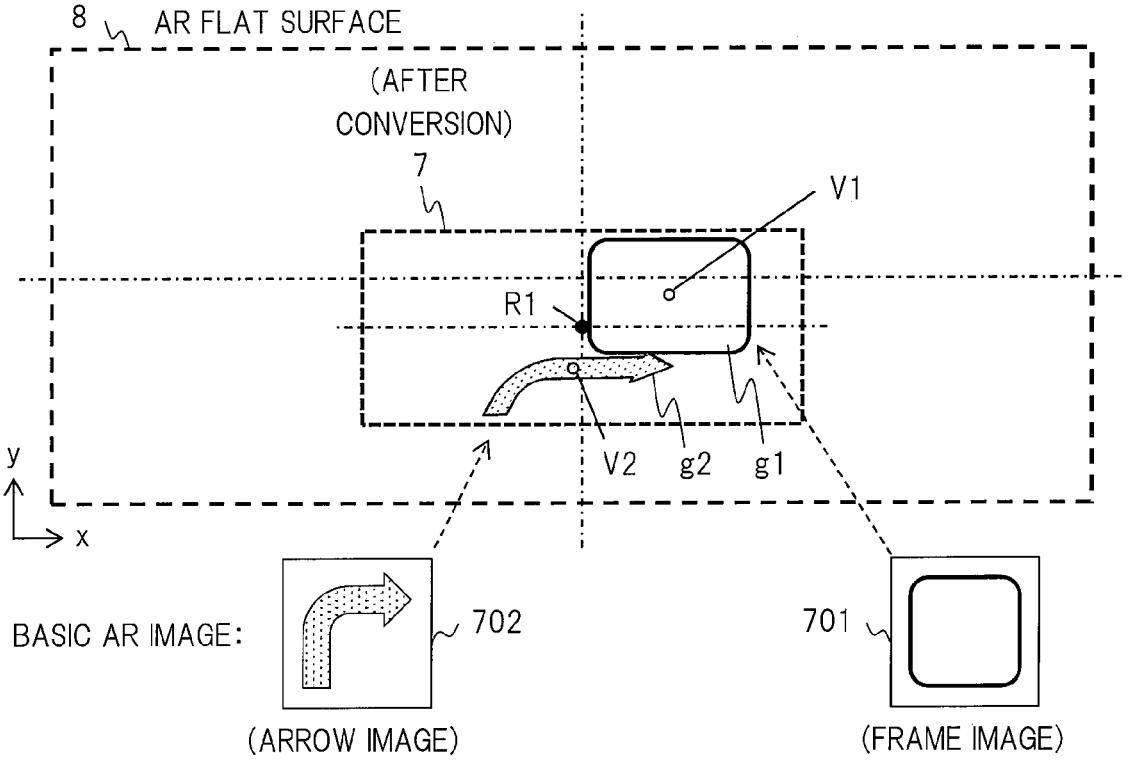
FIG. 17 is a diagram showing an example of arrangement of an AR image in the AR display area on the AR flat surface in the first embodiment.

[AR Flat Surface (2)] FIG. 17 shows an arrangement example of the AR image linked with the AR display area 7 on the AR flat surface 8 of FIG. 16. The display position converter 14 arranges the AR image on the positional coordinates determined inside the AR display area 7. The drawing shows arranged AR images g1 and g2. For example, the AR image g1 (corresponding to the AR image G1) is arranged at a display position centering the point V1 inside the AR display area 7. The AR image g2 (corresponding to the AR image G2) is arranged at a display position centering the point V2. Each of the AR image g1 and the AR image g2 is an image based on a basic AR image created by the AR image creating unit 13. The AR image creating unit 13 creates, for example, a basic AR image (frame image) 701 that is adjusted so as to have a display size corresponding to the object area size, a predetermined display color or others on the basis of the frame image of the source data. The AR image creating unit 13 creates, for example, a basis AR image (arrow image) 702 obtained by adjusting the display size, the display color, the display inclination (such as parallel to the road surface) or others on the basis of the arrow image of the source data. The display position converter 14 arranges the AR images g1 and g2 in the AR display area 7 on the basis of the basic AR images 701 and 702.

In the above-described processing example, note that the display position converter 14 converts the position of the AR display area 7, and arranges (or determines the display position of) the AR image into the converted AR display area 7. However, the processing is not limited to this, and any processing is applicable. For example, while the display position converter 14 may only convert the position of the AR display area 7, the AR image creating unit 13 or the AR display 15 may arrange (or determine the display position of) the AR image into the converted AR display area 7.

Note that the optical system 24 such as the mirror 24A is inserted between the AR flat surface 8 and the practical visual recognition area 5, and therefore, the image contents of the display element 22 and the AR flat surface 8 include a case of image contents that are upside down or others.

[Coordinate Conversion (Distortion Correction)]

Figure 18A:
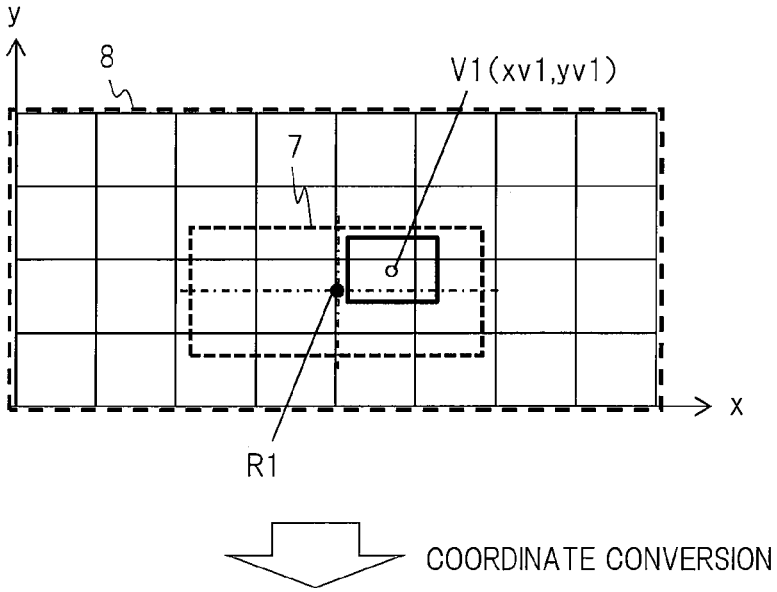
FIGS. 18A and 18B are diagrams showing coordinate conversion from the AR flat surface to a curved visual recognition area in the first embodiment.
Figure 18B:
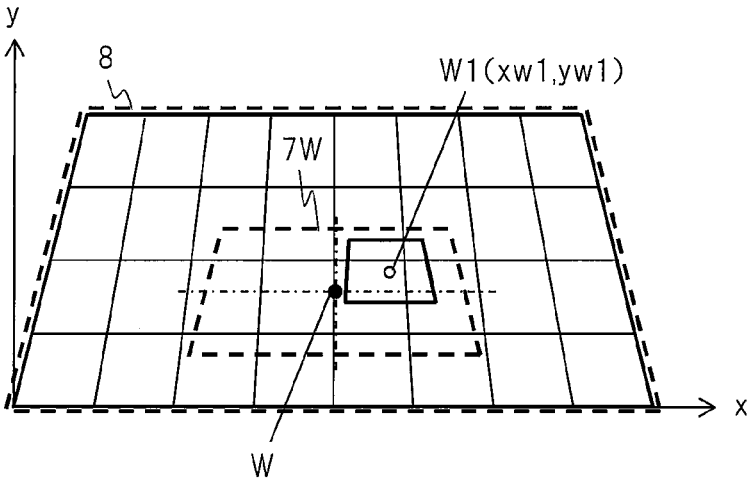

FIGS. 18A and 18B show coordinate conversion (distortion correction) for linkage from the AR flat surface 8 to the three-dimensionally curved visual recognition area 5 corresponding to the windshield 9. Since the curved shape, the size, or others of the visual recognition area 5 of the windshield 9 of the car is previously obtained, the coordinate conversion from the AR flat surface 8 to the visual recognition area 5 can be defined as a predetermined correcting computation. This coordinate conversion can be defined by predetermined projection, projective transformation or others. FIG. 18A shows the AR flat surface 8 caused before the conversion, which has an orthogonal coordinate system having an x axis and a y axis. In FIG. 18B, the curved visual recognition area 5 caused after the conversion is simply shown by a two-dimensional coordinate system (so that the Z-direction component is omitted). Note that this coordinate conversion can be collected as a part of the conversion table.

By this coordinate conversion, the position of the AR display area 7 and the display position of the AR image on the AR flat surface 8 are linked with the position on the curved visual recognition area 5. For example, a center point "R1" of the AR display area 7 on the AR flat surface 8 in FIG. 18A is a point "W" on a curved AR display area 7W caused after the conversion in FIG. 18B. For example, the point V1 (xv1, yv1) of the AR image g1 is a point "W1" (xw1, yw1) on the AR display area 7W caused after the conversion.

The AR display 15 supplies the converted data as shown in FIG. 18B as the AR data to the display 20. In the manner, the AR content (such as the AR image G1) as shown in FIG. 11 is displayed in the visual recognition area 5 by the projection display from the display 20. In this case, the display shift between the real image and the virtual image (the AR image of the AR display area 7) as shown in FIG. 12 is reduced.

[Processing Details (1-1)]

Next, details and a specific example of the processing of the controller 10 will be described.

(1) First, in the above-described S1 and S2, the image input unit 11 acquires the area of the object inside the image 6 of the camera 2, the positional coordinates (x, y) of the center point of the area, and others. For example, the area 601 of the oncoming car 501 inside the image 6 of FIG. 14 and the positional coordinates (x1, y1) of the point Q1, and others are acquired.

(2) In the S3, the information acquiring unit 12 acquires the distance between the position of the subject car and the position of the object in the space on the basis of the positional coordinates (x, y) of the object inside the image 6. For example, a distance "D" (DX, DY, DZ) from the oncoming car 501 of FIG. 15 is acquired.

The distance acquisition will be described in details below. For example, when the distance is measured by using the stereo camera that is the camera 2 of the outside-image capturing unit 102, first, a distance "D24" between a position "P2" of the camera 2 of FIG. 3 and a position "P4" of the object can be computed by using two images on the right and left sides of the camera 2 on the basis of the publicly-known binocular parallax system. Alternatively, when the distance sensor is similarly used, the distance between the distance sensor and the object can be detected.

Next, the information acquiring unit 12 converts the acquired distance D24 into a distance "D14" between the point-of-view position P1 of the driver and the object. This distance can be converted by using, for example, a distance "D12" between the position P2 of the camera 2 and the point-of-view position P1. As the distance D12, a previously-set approximate value may be used. Alternatively, in a case with a function of a driver-image capturing unit 107 described later, this function may be used to measure the point-of-view position P1 for the computation of the distance D12.

(3) In the S4, the AR image creating unit 13 creates the basic AR image to be superimposed on the object. For example, this image is a basic AR image 701 or others in FIG. 17 corresponding to the AR image G1. The controller 10 makes the display position converter 14 perform the conversion processing for the AR display area 7 and the AR image described below.

(4) In the S5, the display position converter 14 determines the position of the AR display area 7 and the display position of the AR image inside the AR display area 7 on the AR flat surface 8 or others, by using the information of the positional coordinates (x, y) of the object inside the image 6, the distance from the object in the space, and others. In this case, the display position converter 14 performs the conversion processing based on the conversion table. The display position converter 14 inputs an input value into the conversion table, and outputs an output value acquired after the conversion. In the example of FIG. 16, the positional coordinates (xr1, yr1) of the center point R1, the lateral width RH1 and the longitudinal width RH2 are acquired as the position of the converted AR display area 7, and the point V1 (xv1, yv1) and the point V2 (xv2, yv2) and others are acquired as the display position of the AR image inside this AR display area 7.

(5) In the S6, the display position converter 14 arranges the AR image at the determined display position inside the converted AR display area 7 on the AR flat surface 8. In the example of FIG. 17, the AR image g1 is arranged at the point V1, and the AR image g2 is arranged at the point V2. The AR display 15 performs the coordinate conversion so as to change the images from the AR flat surface 8 after the arrangement of the AR image to the curved visual recognition area 5 to create the AR data for the display. In the example of FIGS. 18A and 18B, the coordinate-converted AR display area 7W and AR image are created.

[Processing Details (1-2)]

The conversion processing (S5) of the display position converter 14 of the first embodiment will be described in details below.

First, the coordinate conversion for the AR image information will be described below. As shown in the example of FIG. 14, pixel coordinates of the reference point of the target object in the image 6 of the camera 2 are shown as "Q(x, y)". For example, image coordinates of the point Q1 corresponding to the area 601 of the oncoming car 501 are shown as (x1, y1).

Initial setting values of the camera 2 are as follows.

Placement Position from Ground: H (the point p2, the position P2, the height H2 in FIG. 3)

Attachment Angle from Horizontal Surface: $\phi$ (angle $\phi$ indicating the image-capturing direction L2 of FIG. 3)

Vertical Angle of View of Camera Sensor: $\phi v$ (a vertical component of an angle of view $\phi c$ of FIG. 3)

Horizontal Angle of View of Camera Sensor: $\phi h$ (a horizontal component of the angle of view $\phi c$ of FIG. 3)

Number of Vertical Pixels of Camera Sensor: Ny (a longitudinal width Ny of the image 6 of FIG. 14)

Number of Horizontal Pixels of Camera Sensor: Nx (a lateral width Nx of the image 6 of FIG. 14)

Distance between Camera Sensor and End (such as Front Bumper) of Subject Car in Z Direction: J (a distance D6 of FIG. 3, or may be a distance between the point p2 and the point p5.)

In this case, a distance in the going-ahead direction (Z direction) from the subject car to the target object is set as "E" (a distance "DZ" of FIG. 15). A distance in the lateral direction (X direction) from the subject car to the target object is set as "F" (a distance "DX" of FIG. 15).

In this case, on the basis of the pixel coordinates (x, y) of the target object, the distance E can be computed by the following expression 1, and the distance F can be computed by the following expression 2. When a value of the distance F has a negative sign, the value indicates a left side. When the value of the distance F has a positive sign, the value indicates a right side.

$$E=H\cdot\tan(90°-(\phi+\phi v/2)+(y/Ny)\cdot\phi v)-J \quad \text{(Expression 1)}$$

$$F=E\cdot\tan(((x-(Nx/2))/Nx)\cdot(\phi h/2)) \quad \text{(Expression 2)}$$

The initial setting values of the HUD apparatus 1 are as follows.

Depression Angle of Virtual Image: $\alpha hud$ (such as the angle $\alpha h$ of FIG. 4)

Driver's Eye Position from Ground: Hhud (the height H1 of FIG. 3)

Vertical Angle of View of HUD: $\beta v$ (a vertical component of the angle of view $\beta$ of the AR display area 7 of FIG. 3)

Horizontal Angle of View of HUD: $\beta h$ (a horizontal component of the angle of view $\beta$ of the AR display area 7 of FIG. 3)

Number of Vertical Pixels of HUD: Nyhud (the longitudinal width RH2 of the AR display area 7 of FIG. 16)

Number of Horizontal Pixels of HUD: Nxhud (the lateral width RH1 of the AR display area 7 of FIG. 16)

The display position distance information of the virtual image 302 ahead of the visual recognition area 5 of the subject car is configured to contain a distance "En" and a distance "Fn". The distance En is a distance in the going-ahead direction (Z direction) (corresponding to the distance D13 or the distance D23 of FIG. 3). The distance Fn is a distance in the right and left direction (X direction). The display pixel coordinates of the display element 22 of the HUD apparatus 1 are set as (xhud, yhud). The distance En is expressed by the following expression 3. The distance Fn is expressed by the following expression 4. The display pixel coordinates (xhud, yhud) are set so as to satisfy the following expressions 3 and 4.

$$En=Hhud\cdot\tan(90°-(\alpha hud+\beta v/2)+(yhud/Nyhud)\cdot\beta v)-J \quad \text{(Expression 3)}$$

$$Fn=En\cdot\tan(((xhud-(Nxhud/2))/Nxhud)\cdot(\beta h/2)) \quad \text{(Expression 4)}$$

Figure 19A:
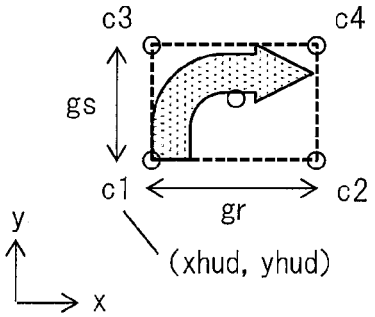
FIGS. 19A-19C are diagrams showing a conversion example of the AR image in the first embodiment.
Figure 19B:
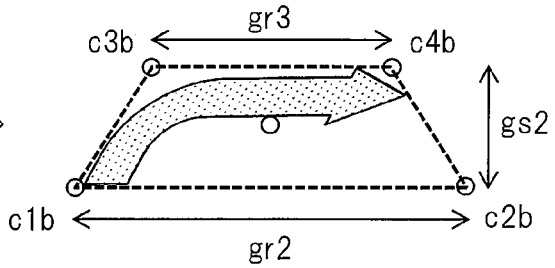
Figure 19C:
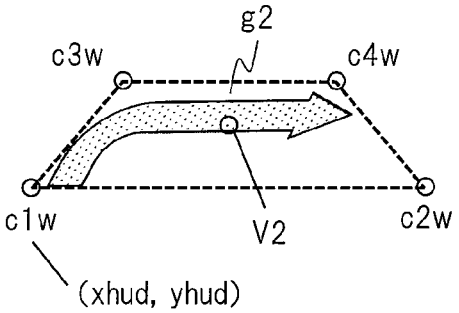

Next, details of the AR image conversion performed when the AR image is arranged in the AR display area 7 as shown in FIG. 17 will be described. FIGS. 19A-19C show an example of the AR image conversion. The present example shows the conversion for the AR image G2 of FIG. 11 from a basic AR image 702 that is an arrow image of FIG. 17 to the AR image g2. FIG. 19A shows an arrow image caused before the conversion. This AR image has a rectangular shape having a frame with a right angle including the arrow image therein. Four corner points of the rectangle are indicated as "c1" to "c4". The drawing shows a lateral width "gr" of the rectangle and a longitudinal width "gs" thereof. Display pixel coordinates of the point c1 are set as (xhud, yhud).

FIG. 19B shows an arrow image caused after first conversion. In this AR image, the frame including the arrow image therein has a trapezoidal shape. The first conversion is conversion for creating an arrow image that is parallel to the road surface, and is performed before the conversion for the position of the AR display area 7. For example, the AR image creating unit 13 performs a processing until the first conversion. Four corner points of the trapezoid are indicated as "c1b" to "c4b". In the first conversion, the four points (c1b to c4b) of the trapezoid caused after the conversion are acquired on the basis of the four points (c1 to c4) of the rectangle caused before the conversion by a publicly-known projective transformation method. A width of a low side of the trapezoid, a width of an upper side thereof, and a longitudinal width thereof are indicated as "gr2", "gr3" and "gs2", respectively.

FIG. 19C shows an arrow image caused after second conversion. Four points ("c1w" to "c4w") of the trapezoid of the arrow image caused after the second conversion are acquired from the arrow image caused after the first conversion by the second conversion corresponding to the conversion for the position of the AR display area 7. In the computation of the second conversion, the display position distance information (En, Fn) for the four points is computed by the expressions 3 and 4 so as to satisfy the positional coordinates of the four points c1w to c4w. The display position converter 14 (or the AR display 15) deforms the entire arrow image from a state of FIG. 19B to a state of FIG. 19C on the basis of the acquired four points c1w to c4w by performing the publicly-known projective transformation method.

On the basis of the above-described computation, the controller 10 computes the position information (the position M2 of FIG. 15) of the object of the real image 301 in the space by using the positional coordinates (x, y) of the object inside the image 6 of the camera 2 and the distance information from the object in the space. The position of the object in the space can be computed on the basis of the position (the position M1 of FIG. 15) of the subject car by using the distances E and F (the distance D of FIG. 15) of the expressions 1 and 2.

The controller 10 determines the display position of the virtual image 302 inside the AR display area 7 in the space so as to be matched with the position information (the position M2) of the object of the real image 301 in the space. That is, the display position of the virtual image 302 inside the AR display area 7 is determined so that the positions of the objects of the virtual image 302 and the real image 301 overlap on the line of sight L1 extending from the point-of-view position P1. The display position of the virtual image 302 corresponds to a position P3 (X3, Y3, Z3) in the space of FIG. 3, and corresponds to, for example, the point V1 (xv1, yv1) on the AR flat surface 8 of FIG. 16. The controller 10 arranges the AR image inside the AR display area 7 of the AR flat surface 8 on the basis of the display position of the virtual image 302 (FIG. 17). The controller 10 performs the coordinate conversion for the AR flat surface 8 caused after the arrangement (FIGS. 18A and 18B), and outputs the converted data as the AR data.

At the time of the coordinate conversion for a flat surface having two axes as shown in FIGS. 18A and 18B, the AR display 15 divides the surface in the two-axes directions into a plurality of sections, and stores data of a cross point between the divided sections. In the example of FIGS. 18A and 18B, the surface is divided into 8 unit sections by using 9 points in the x direction, and is divided into 4 unit sections by using 5 points in the y direction. The AR display 15 performs the coordinate conversion by using a predetermined coordinate conversion table. The AR display 15 acquires data of points other than the cross points by using interpolation calculation using the cross points.

[Conversion Table (1)]

Figure 20:
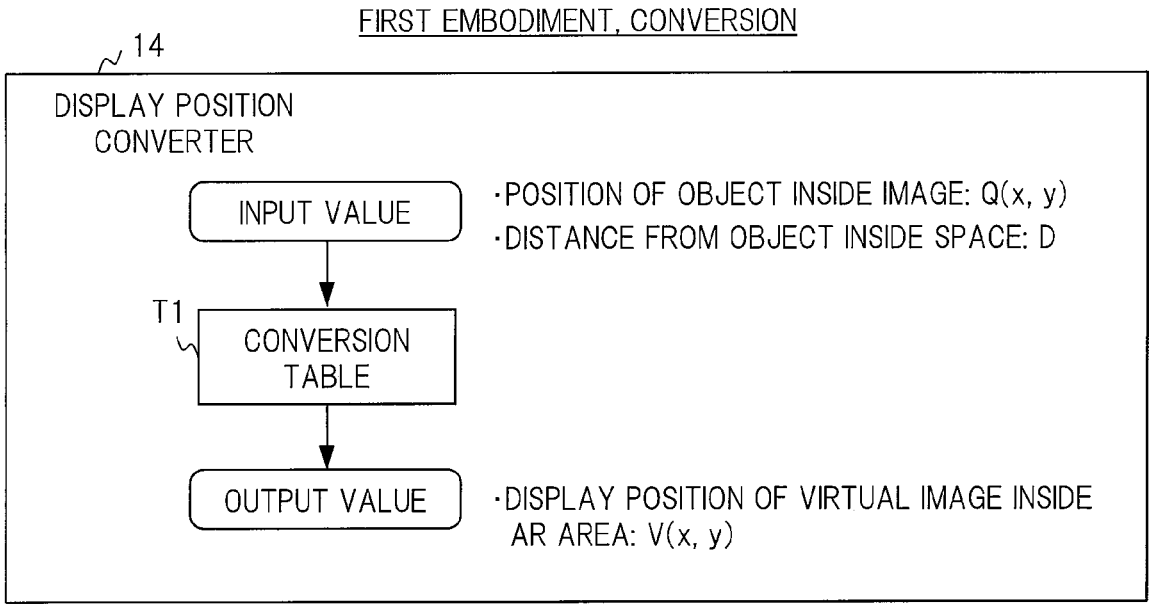
FIG. 20 is a diagram showing computation using a conversion table of a display position converter in the first embodiment.

FIG. 20 shows a concept of the computation using a conversion table of the display position converter 14 in the first embodiment. In the first embodiment, the display position converter 14 uses a conversion table (first conversion table) "T1". The conversion table T1 is previously set in, for example, a memory (ROM) inside the controller 10.

The display position converter 14 inputs a position (Q (x, y)) of the object inside the image and the distance D between the subject car and the object into the conversion table T1 as input values, and outputs a display position (V(x, y) of the AR image inside the AR display area 7 as output values on the basis of the conversion in the conversion table T1.

[Effects and Others]

As described above, since the HUD apparatus 1 of the first embodiment has the function of automatically correcting the positions of the AR display area 7 and the AR image, the display shift between the real image and the virtual image is excluded or reduced, so that the favorable AR display is achieved. In the position P2 of the camera 2 of the subject car and the point-of-view position P1 of the driver, a range in which position change is allowed can be larger than a conventional one.

In the first embodiment, note that the correction and the conversion for the positions of the AR display area 7 and the AR image in the up and down direction (Y direction) has been mainly described. However, the direction is not limited to this, and the correction and the conversion are also similarly applicable also in the right and left direction (X direction).

Second Embodiment

With reference to FIGS. 21 to 24, a HUD apparatus of a second embodiment of the present invention will be described. A basic configuration of the second embodiment and others is the same as that of the first embodiment. A different configuration part of the second embodiment and others from that of the first embodiment will be described below. The HUD apparatus 1 of the second embodiment has a function of correcting the display shift on the basis of the image of the camera 2 by the processing of the controller 10, and besides, detecting the angle θ of the mirror 24A of the optical system 24 to correct the display shift on the basis of the angle θ. For example, when the point-of-view position of the driver largely changes upward/downward from the basic setting point-of-view position, the display shift between the real image and the virtual image becomes large, and this display shift cannot be handled only by the function of the correction of the first embodiment. Therefore, the second embodiment provides the function of correcting the AR display content in accordance with the state of the angle θ on the basis of a mechanism that can change the position of the AR display area 7 by adjusting the angle θ of the mirror 24A of the optical system 24.

Problem of Comparative Example

A HUD apparatus of a comparative example of the second embodiment has the following problem. As described above in FIGS. 4 to 8, the point-of-view position depends on the states of the driver's posture and human body size, and the line of sight on which the driver watches the AR display area depends on the states. The driver performs the basic setting including the adjustment of the angle θ of the mirror 24A so that the driver can watch the virtual image of the AR display area 7 of the HUD in the visual recognition area 5 in accordance with the point-of-view position of the driver himself/herself.

For example, the case of the person having the standard posture and human body size causes the state as shown in FIG. 3 or 4 so that the point-of-view position "P1A" and the eye box "EA" are set as the basic setting. When the point-of-view position is included inside the eye box EA after the basic setting, the display shift between the real image and the virtual image is eliminated or small, and therefore, the driver is easy to visually recognize the virtual image. For example, from the position P1A, the visual recognition area 5 can be watched as shown in FIG. 11. After this state, for example, when the first driver changes the posture into a second posture of FIG. 5, or when the second driver having a different human body size with the second posture uses the car, the point-of-view position is out of the eye box EA that is the basic setting. In such cases, the display shift between the real image and the virtual image is large, and therefore, the driver is difficult to visually recognize the virtual image.

In the examples of FIGS. 5 and 7, when the virtual image of the AR display area 7 as the basic setting matched with the point-of-view position PIA of the person with the first posture is watched from the point-of-view position P1B of the person with the second posture, the display shift between the real image and the virtual image is large, and therefore, the person is difficult to visually recognize the virtual image. In the examples of FIGS. 6 and 8, when the virtual image of the AR display area 7 adjusted so as to be matched with the point-of-view position P1B of the person with the second posture is watched from the point-of-view position P1B of the person with the second posture, the display shift between the real image and the virtual image exists, and therefore, the person is still difficult to visually recognize the virtual image. For example, in the case of the second driver having a larger human body size, the angle θ of the mirror 24A is changed from the angle θA to the angle θB by the readjustment.

In the example of FIG. 8, as the basic setting matched with the point-of-view position P1A of the person with the first posture, the state of the angle θ of the mirror 24A is the angle θA indicated by the mirror 24A set at a position (A). In the state of the angle θA, the center axis of the image light is projected and reflected at the position of the point CA of the visual recognition area 5. The line of sight L1A is caused when the virtual image 302 of the AR display area 7a1 ahead of the visual recognition area 5 is watched through the point CA of the AR display area 7 in the visual recognition area 5. A setting state matched with the point-of-view position P1B of the person with the second posture is the angle θB indicated by the mirror 24A set at a position (B). In the state of the angle θB, the center axis of the image light is projected and reflected at the position of the point CB of the visual recognition area 5. The line of sight L1B is caused when the virtual image 302 of the AR display area 7a3 ahead of the visual recognition area 5 is watched through the point CB of the AR display area 7 in the visual recognition area 5.

The point-of-view position P1B of the person with the second posture is higher than the point-of-view position P1A of the person with the first posture (H1A<H1B, Y1A<Y1B). Therefore, in the visual recognition area 5, the virtual image (such as the AR image G1) is watched to shift to a lower position than the position of the object (such as the oncoming car 501) of the real image 301 as shown in the example of FIG. 12.

As shown in the examples of FIGS. 7 and 8, the expected angle and the depression angle of the line of sight caused when the virtual image of the AR display area 7 is watched from the point-of-view position depending on the driver's posture or others are different. For example, FIG. 7 has a state "α1≠a3". In accordance with the angle, the display shift between the object of the real image 301 and the virtual image 302 is caused.

When a HUD apparatus of a comparative example of the second embodiment does not have the function of the HUD apparatus 1 of the second embodiment, the display shift between the real image and the virtual image in the visual recognition area 5 as shown in FIGS. 12 and 13 exists in the watching from the point-of-view position P1B of the person with the second posture in FIGS. 5 and 6. Therefore, the driver is difficult to or cannot visually recognize the virtual image.

The HUD apparatus of the comparative example has a mechanism that adjusts the angle θ of the mirror 24A by using a manual operation as the basic setting function. However, while the position of the AR display area 7 with reference to the visual recognition area 5 can be roughly adjusted, the display shift between the real image and the virtual image cannot be automatically corrected. For example, in cases of persons each having larger and smaller human body sizes, the adjustment in the basic setting is necessarily difficult to cause a state in which the person can watch the virtual image of the AR display area 7 inside the visual recognition area 5.

Accordingly, the HUD apparatus 1 of the second embodiment has a function of detecting the state of the angle θ of the mirror 24A of the optical system 24 and performing the conversion processing that corrects the display position of the AR image inside the AR display area 7 so as to be matched with the state of the angle θ. In the manner, when the driver adjusts the angle θ of the mirror 24A so as to be matched with the point-of-view position, the favorable AR display having the smaller display shift between the real image and the virtual image than the conventional one is achieved.

[Hud Apparatus]

Figure 21:
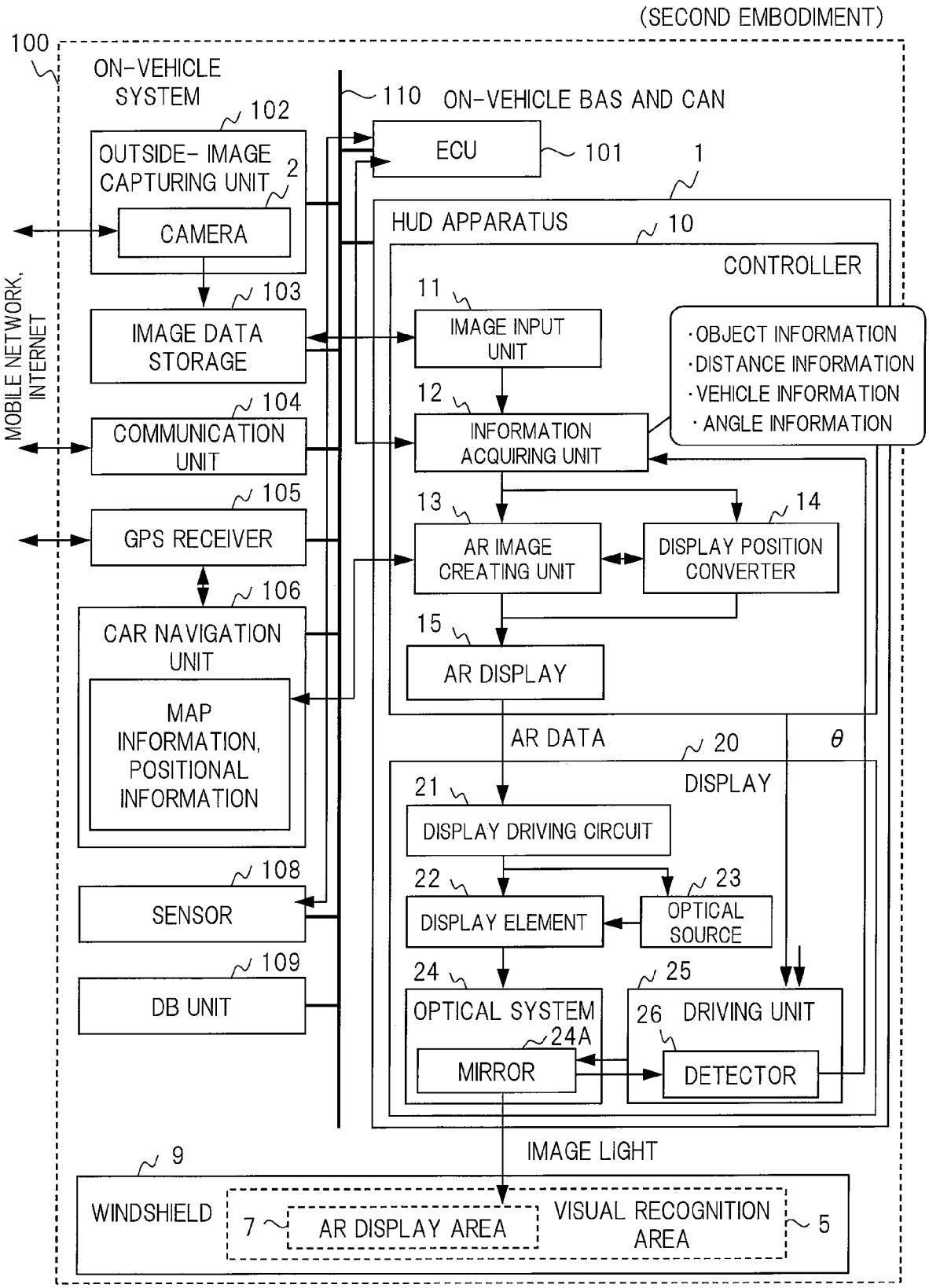
FIG. 21 is a diagram showing a configuration of an on-vehicle system including a HUD apparatus of a second embodiment of the present invention.

FIG. 21 shows a configuration of the on-vehicle system 100 including the HUD apparatus 1 of the second embodiment. In the display 20 of the HUD apparatus 1, the driving unit 25 includes a detector 26. The detector 26 detects the angle θ of the mirror 24A of the optical system 24 or others. Although not illustrated, the driving unit 25 includes an operational button or others that can change the angle θ of the mirror 24A by using a manual operation. The driving unit 25 also includes a function of correcting the angle θ in accordance with the control of the controller 10. On the basis of the input from this operational button or others, a motor or others is driven by the driving unit 25 to change the angle θ of the mirror 24A (see, for example, FIG. 8). After the angle θ is changed, the detector 26 detects the angle θ at this time. The detector 26 may detect and output the angle θ at any time, or may detect and output the angle θ only in the change. The detector 26 outputs the angle information containing the detected angle θ to the controller 10. Note that a method of detecting the angle θ by the detector 26 is not particularly limited.

The information acquiring unit 12 of the controller 10 acquires the angle information from the detector 26, and outputs the angle information together with other information to the display position converter 14. Note that the display position converter 14 may receive the angle information as input from the detector 26. The display position converter 14 performs the conversion processing or others for the AR display area 7 and the display position of the AR image by using the angle information and the above-described object information and distance information. This conversion processing is different from the conversion processing of the first embodiment. The display position converter 14 determines the display position of the AR image inside the AR display area 7 in accordance with the state of the angle θ of the mirror 24A so that the display position is corrected in the up and down direction (Y direction). In the manner, the display position of the virtual image 302 with reference to the object of the real image 301 is matched with the appropriate position.

[Visual Recognition Area]

In the HUD apparatus 1 of the second embodiment, the display position of the AR image inside the AR display area 7 is corrected in accordance with the state of the angle θ of the mirror 24A. Therefore, for example, when the AR display area 7 in the visual recognition area 5 is watched from the point-of-view position P1B of the person with the second posture shown in FIGS. 5 and 6, the visual recognition area 5 having the reduced display shift between the real image and the virtual image can be watched as shown in, for example, FIG. 22.

Figure 22:
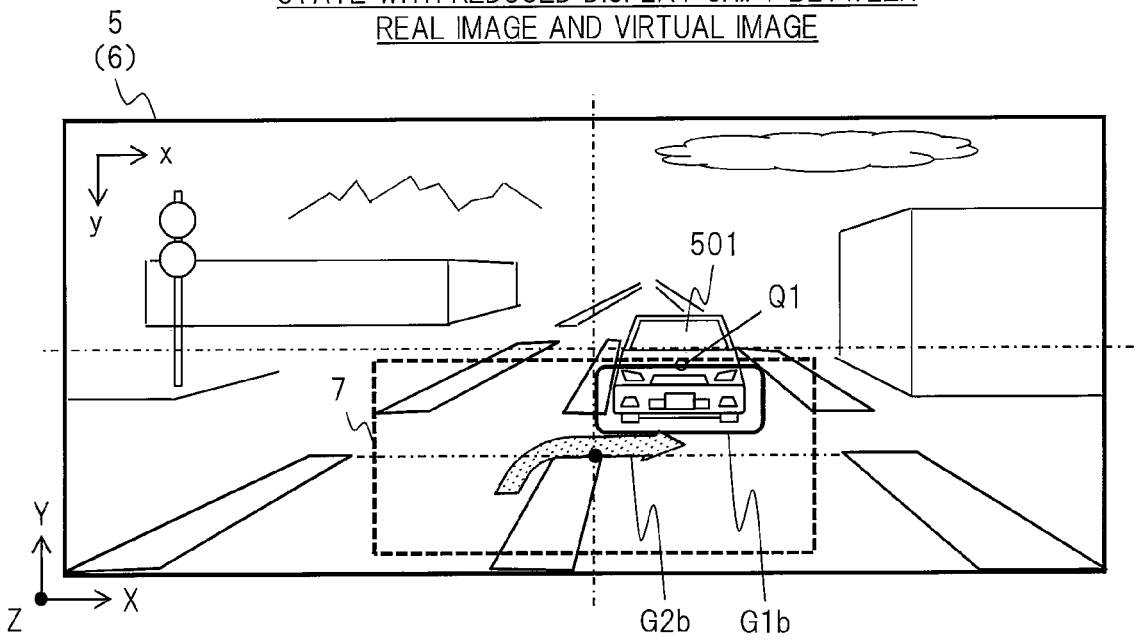
FIG. 22 is a diagram showing an example of a state with a reduced display shift as the example of the visual recognition area watched from the driver in the second embodiment.

FIG. 22 shows an example of the visual recognition area 5 in the second embodiment. In this visual recognition area 5, the position of the AR display area 7 is not different from the position of the AR display area 7 of FIG. 12 so much, but shifts to a position that is lower than the object (such as the oncoming car 501) of the real image 301. However, the display position of the AR image inside the AR display area 7 is corrected by the conversion of the second embodiment so that the display shift is reduced. For example, the AR images G1b and G2b are shown. The frame image that is the AR image G1b is corrected to be at a position that is upper than the display position of the AR image G1 of FIG. 12, and is close to the position (Q1) of the oncoming car 501 of FIG. 11. A display size of the AR image G1b is also corrected by the conversion. A display positional relation is improved so as to have an almost appropriate state in which the virtual image (the AR image G1b) roughly overlaps the object area (the oncoming car 501). From the point-of-view position P1B of the person with the second posture, the person can watch the visual recognition area 5 with the reduced display shift between the real image and the virtual image. Similarly, the arrow image that is the AR image G2b is also corrected to be at a position that is upper than the display position of the AR image G2 of FIG. 12, and is close to the position (Q2) of FIG. 11. From the point-of-view position P1B, the AR image G2b can be roughly watched on the road surface of the traffic intersection. The driver can preferably roughly visually recognize the AR images G1b and G2b.

[Processing Details (2-1)]

Next, details and a specific example of the processing of the controller 10 in the second embodiment will be described.

(1) The driver takes the driver's seat, and adjusts the state of the driver's seat so as to be matched with the driver's human body size and posture. For example, the case of the first driver having the standard human body size causes the first posture of FIG. 4. For example, the case of the second driver having the larger human body size causes the second posture of FIG. 5.

(2) When the driver uses the AR function of the HUD apparatus 1, the driver adjusts the AR display area 7 as the basic setting. The driver adjusts the position of the AR display area 7 in the visual recognition area 5 by adjusting the angle θ of the mirror 24A of the display 20 through the manual operation such as the up or down input of the operational button. The driving unit 25 drives the motor to change the angle θ of the mirror 24A in the positive or negative direction in accordance with the input signal of the manual operation. At this time, on the visual recognition area 5, the HUD apparatus 1 displays the predetermined virtual image that becomes guidance for the adjustment. The virtual image of the guidance moves in accordance with the manual operation. The driver performs the adjustment so that the position becomes a position at which the driver himself/herself feels comfortable while watching the virtual image of the guidance. Note that the eye box corresponding to the point-of-view position P1 at this time is also determined in accordance with the adjustment (as the basic setting). For example, the eye box "EA" is set.

(3) The detector 26 detects the adjusted angle θ of the mirror 24A, and output the angle information to the controller 10.

(4) On the basis of the positional coordinates (x, y) of the point Q of the object inside the image 6 of the camera 2, the distance D from the object in the space and the angle θ, the display position converter 14 performs the conversion processing to the AR display area 7 on the AR flat surface 8 so as to correct the display position of the AR image caused when the driver watches the AR display area 7 from the point-of-view position. This conversion processing is performed in real time, and includes the following processing.

On the basis of the positional coordinates (x, y) of the center point Q of the object inside the image 6 and the distance D from the object in the space as similar to the first embodiment, the display position converter 14 computes the pixel coordinates (x, y) of the point V that is the display position of the AR image inside the AR display area 7. At this time, the display position converter 14 performs the conversion processing by using the conversion table for use in the second embodiment.

[Conversion Table (2)]

Figure 23:
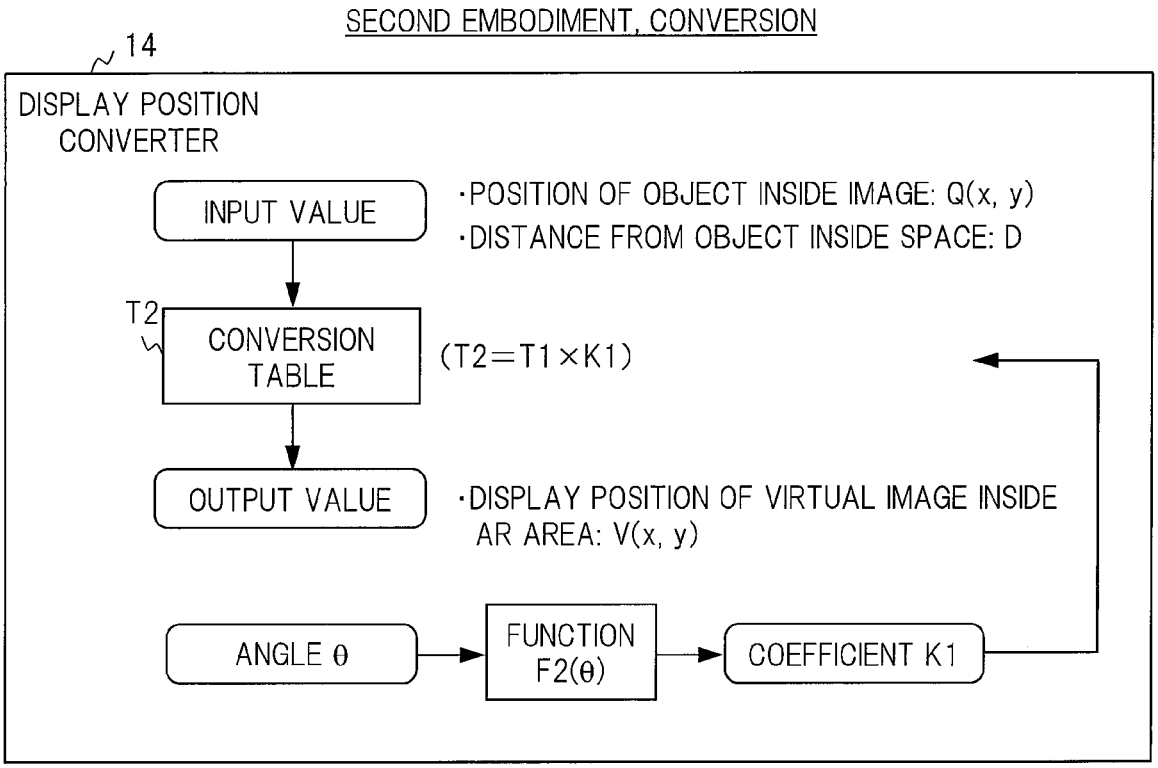
FIG. 23 is a diagram showing a conversion processing of a display position converter in the second embodiment.

FIG. 23 shows a concept of the computation using a conversion table of the display position converter 14 in the second embodiment. In the second embodiment, the display position converter 14 uses a conversion table (second conversion table) "T2". The conversion table T2 is configured by multiplication of the conversion table T1 of the first embodiment and a predetermined coefficient "K1".

A reference of the conversion in the second embodiment is previously designed so as to be matched with, for example, the point-of-view position in the first state of the person with the standard posture or others as shown in FIGS. 2 to 4. That is, as the reference, the conversion table T1 as similar to the first embodiment can be used first. This conversion table T1 is multiplied by the coefficient K1 for use in considering the angle θ of the mirror 24A in the second embodiment to configure the conversion table T2.

The coefficient K1 is determined by a predetermined function "F2". The function F2 is a function containing the angle θ of the mirror 24A as a variable. The angle θ is contained as an input value of the function F2. The coefficient K1 is acquired as an output value of the function F2. The function F2 is defined almost in accordance with the shape of the mirror 24A. The function F2 is previously set in, for example, the memory (ROM) inside the controller 10.

Further, as a modification example of the second embodiment, the following method is applicable in order to increase a speed of the computation for the conversion processing using the conversion table T2. The multiplication of the conversion table T2 (T1×K1) or the function F2 is complicated in some cases. In such a case, as a modification example, the computation is simplified to increase the speed by using a publicly-known Lagrange interpolation method. Note that accuracy of the computation is not reduced by this simplification, and accuracy of the correction for the display shift of the AR display is secured.

[Processing Details (2-2)]

The details of the conversion processing in the second embodiment will be described below. As different configuration points of this conversion processing from the conversion processing in the first embodiment, the point-of-view position of the driver and the display shift in the up and down direction (Y direction) are applied. When the expected angle at the time of the watching of the virtual image from the point of view of the driver and the corresponding depression angle are different in the system including the HUD apparatus 1 as shown in the examples of FIGS. 7 and 8, the depression angle αhud in the above-described expressions 3 and 4 is different. As a result of the different depression angle αhud, the display pixel coordinates (xhud, yhud) of the display element 22 is different. Therefore, it is necessary to correct the conversion table T1, and the conversion table T1 is corrected by using the coefficient K1 to configure the conversion table T2. For example, cases with the large and small depression angles αhud are shown in FIGS. 24A and 24B.

Figure 24A:
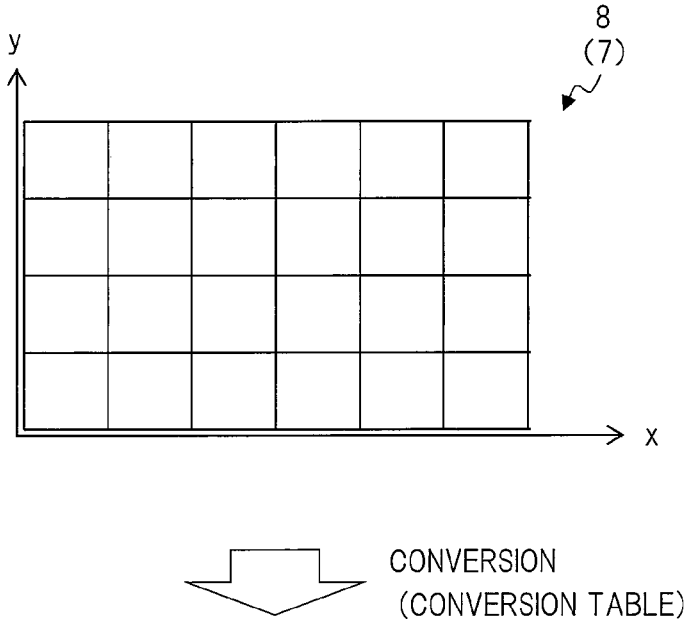
FIGS. 24A and 24B are diagrams showing coordinate conversion from the AR flat surface to a curved visual recognition area as a part of the conversion processing of the display position converter in the second embodiment.
Figure 24B:
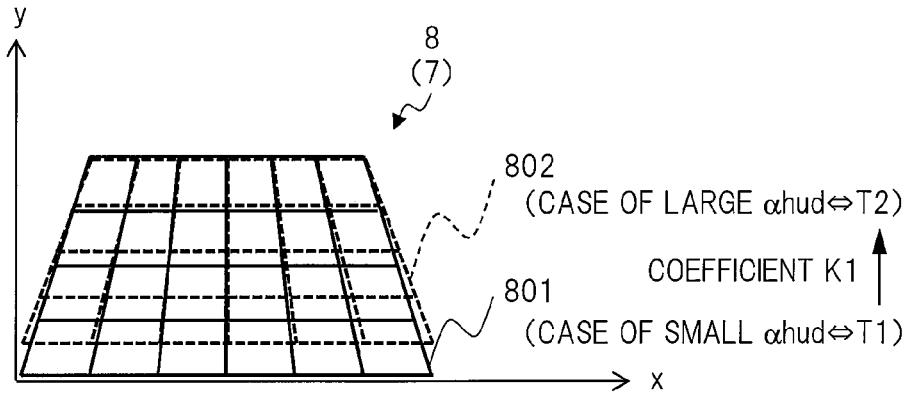

FIGS. 24A and 24b show the conversion for the AR flat surface 8 in the second embodiment related to the conversion for the AR display area 7. This conversion includes the above-described coordinate conversion. The display position converter 14 also performs the coordinate conversion from the AR flat surface 8 to the curved visual recognition area 5 as a part of the conversion processing. FIG. 24A shows the AR flat surface 8 and the AR display area 7 caused before the conversion, and shows a flat plane having two axes (x, y) as similar to the above description. In this specification, simply, the AR flat surface 8 and the AR display area 7 are shown as the same one. FIG. 24B shows the AR flat surface 8 and the AR display area 7 caused after the conversion. On the AR flat surface 8 caused after the conversion, a matrix 801 with a solid line shows the case with the small depression angle αhud, and corresponds to the conversion table T1 of the first embodiment. A matrix 802 with a broken line shows the case with the large depression angle αhud, and corresponds to the conversion table T2 of the second embodiment. A shape of the matrix 802 is watched as a trapezoidal shape that is more tilted than the matrix 801.

The conversion table T1 of the first embodiment can be used as the conversion table T2 by multiplying the coefficient K1 for use in the correction in accordance with the angle θ of the mirror 24A to the conversion table T1. In other words, the matrix 802 is acquired by multiplying the coefficient K1 to the matrix 801. The display position of the AR image inside the AR display area 7 is converted by applying the conversion table T2 in accordance with the point-of-view position and the depression angle linked with the angle θ as shown in the matrix 802. In the manner, in the visual recognition area 5 watched from the point-of-view position of the driver, the display shift between the real image and the virtual image is reduced. In the case with the small depression angle αhud in the second embodiment, when the coefficient K1 is 1, this case is equivalent to the application of the conversion table T1.

[Effects and Others]

As described above, the HUD apparatus 1 of the second embodiment has the function of automatically correcting the display position of the AR image inside the AR display area 7 in accordance with the state of the angle θ of the mirror 24A, and therefore, the display positional shift between the real image and the virtual image is eliminated or reduced, so that the favorable AR display is achieved. When the system has the mechanism capable of adjusting the position of the AR display area 7 by adjusting the angle θ of the mirror 24A in accordance with the driver's posture and human body size, the more favorable AR display having the reduced display shift is achieved.

Third Embodiment

Figure 25:
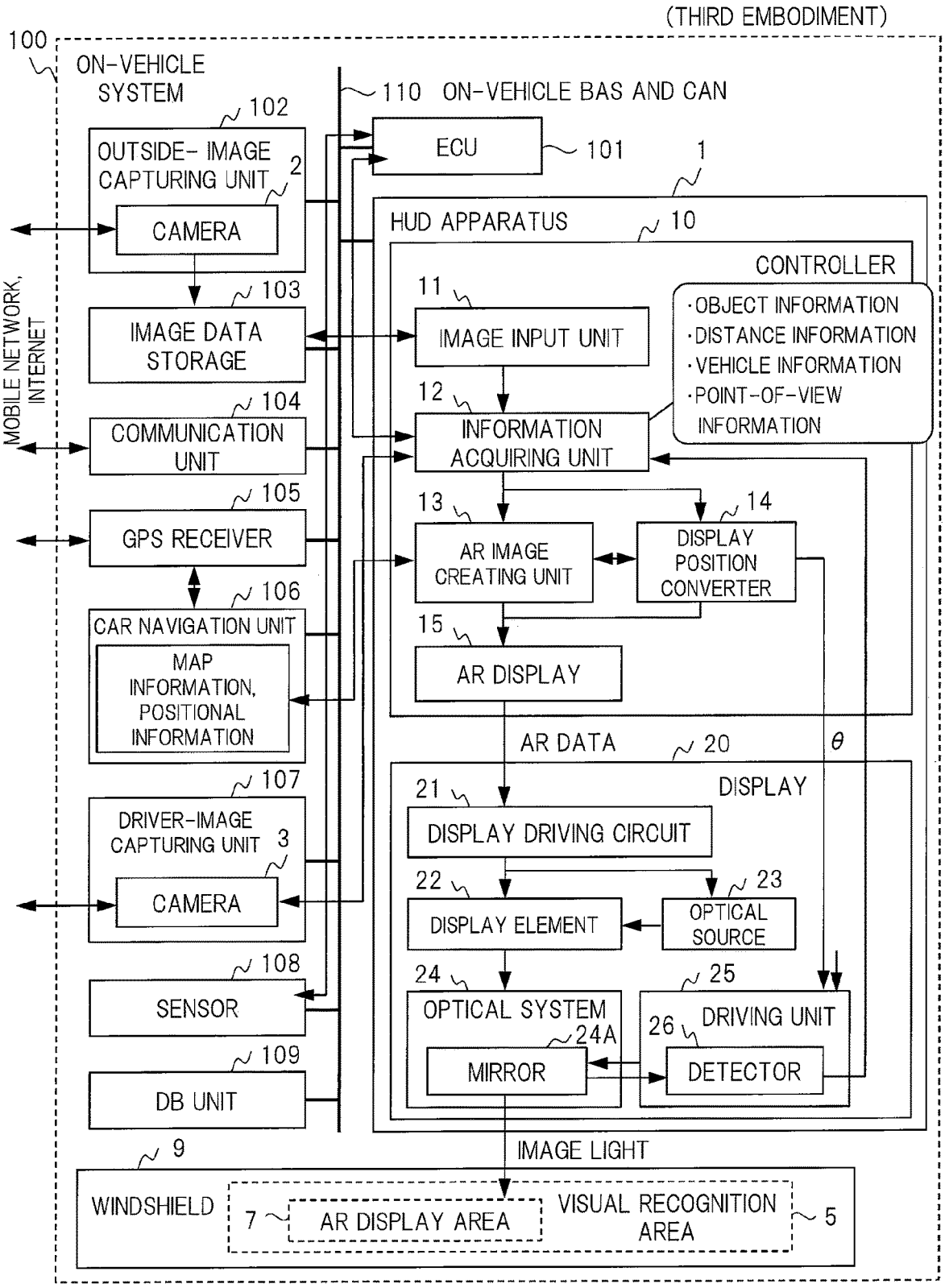
FIG. 25 is a diagram showing a configuration of an on-vehicle system including a HUD apparatus of a third embodiment of the present invention.
Figure 26:
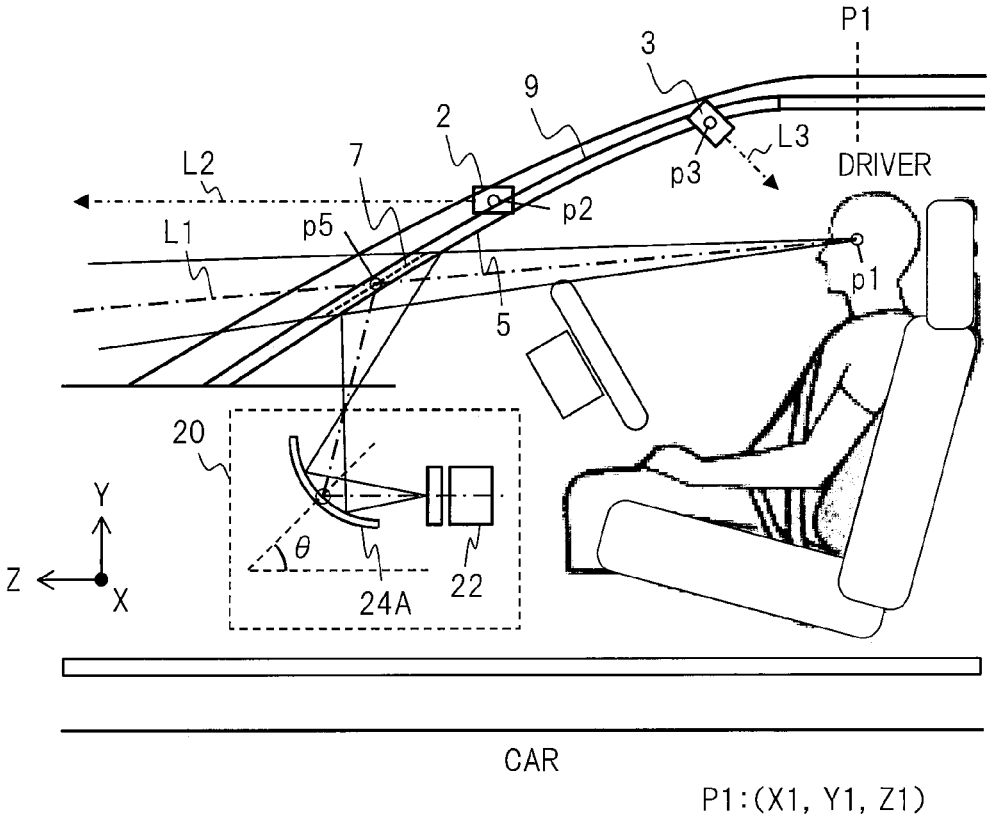
FIG. 26 is a diagram showing a state in which a vicinity of a driver's seat of a car is laterally watched in a third embodiment.
Figure 27:
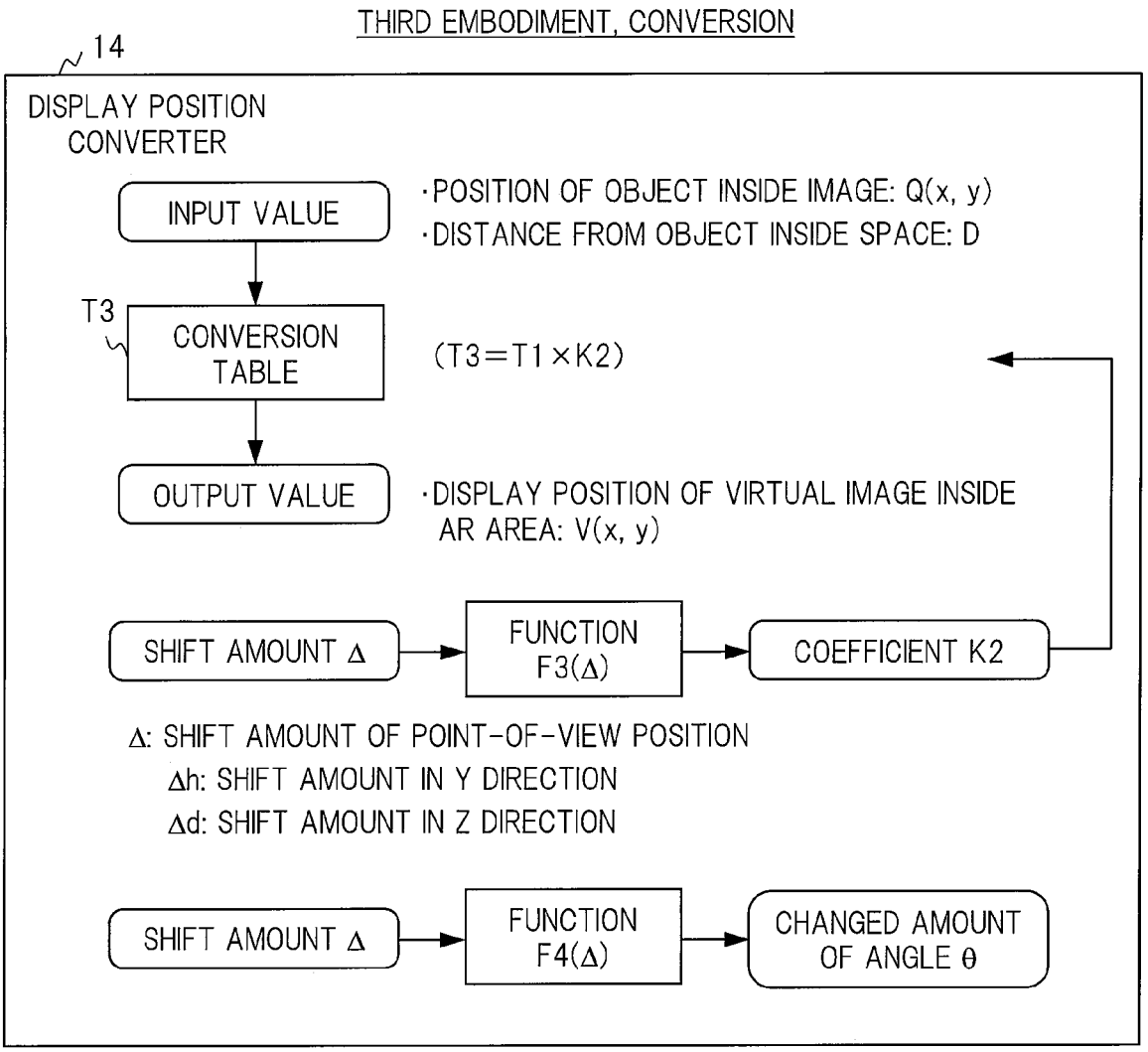
FIG. 27 is a diagram showing a conversion processing of a display position converter in the third embodiment.

With reference to FIGS. 25 to 27, a HUD apparatus of a third embodiment of the present invention and others will be described. The HUD apparatus 1 of the third embodiment has a function of detecting the point-of-view position of the driver in addition to the functions of the correction for the AR display contents by the processing of the controller 10 in the first embodiment and the correction in accordance with the angle θ of the mirror 24A in the second embodiment and others. In this function, a driver-image capturing unit 107 of the on-vehicle system 100 is used. The HUD apparatus 1 of the third embodiment has a function of automatically adjusting the angle θ of the mirror 24A in accordance with the point-of-view position of the driver. That is, the position of the AR display area 7 in the visual recognition area 5 is set in accordance with the angle θ. The HUD apparatus of the third embodiment has a function of correcting the display position of the AR image in the AR display area 7 in accordance with the point-of-view position, the angle θ and the state of the position of the AR display area 7.

Problems of Comparative Example

A HUD apparatus of a comparative example of the third embodiment has the following problems. A basic problem is the same as the problems of the HUD apparatuses of the comparative examples of the first embodiment and the second embodiment. In FIGS. 4 to 8, in accordance with the point-of-view position P1 of the driver with the first or second posture, the angle θ of the mirror 24A is adjusted to a position at which the AR image of the AR display area 7 can be watched. For example, in the case of FIG. 8, the angle θ of the mirror 24A is changed from the angle RA to the angle θB so that the point-of-view position P1B of the person with the second posture is matched. In such a case, the expected angle and the depression angle caused when the virtual image 302 of the AR display area 7 at the position P3 ahead of the visual recognition area 5 is watched from the point-of-view position P1B are different. In the manner, the case of the watching from the point of view of the driver causes the display shift between the real image and the virtual image.

Accordingly, the HUD apparatus 1 of the third embodiment has a function of performing a conversion processing that corrects the display position of the AR image inside the AR display area 7 so as to be matched with the point-of-view position in accordance with the detection result of the point-of-view position (the position P1 of FIG. 3) of the driver.

[HUD Apparatus]

FIG. 25 shows a configuration of the on-vehicle system 100 including the HUD apparatus 1 of the third embodiment. The on-vehicle system 100 includes the driver-image capturing unit 107. The driver-image capturing unit 107 includes a camera 3, captures an image in a predetermined range inside the car including the driver's eyes by using one or more cameras 3, and performs a predetermined processing. The camera 3 is a driver camera or an in-vehicle camera, and outputs the captured image data. The camera 3 having predetermined image-capturing direction and angle of view is placed at a predetermined position of the vehicle (FIG. 26). The driver-image capturing unit 107 detects the point-of-view position P1 (point p1) and the line of sight L1 of the driver by using the image of one or more cameras 3 (FIG. 26). The driver-image capturing unit 107 outputs at least the point-of-view information containing the detected point-of-view position and line of sight to the controller 10 of the HUD apparatus 1. Note that the point-of-view information containing the eye position P1 may be the information of each position of the right and left eyes or the information of the position such as an intermediate point between the both eyes or others.

The driver-image capturing unit 107 outputs the image data of the camera 3, the point-of-view information acquired by the predetermined processing or others, to the HUD apparatus 1 or the ECU 101. The HUD apparatus 1 or the ECU 101 can perform the control by using the point-of-view information or others. The driver-image capturing unit 107 may store the image data of the camera 3 or the acquired information into the image data storage 103.

The driver-image capturing unit 107 includes a signal processor that performs a predetermined processing by using the image of the camera 3. The signal processor may be included in the HUD apparatus 1 or the ECU 101. The function of the driver-image capturing unit 107 can be configured by using a publicly-known technique. In the third embodiment, the driver-image capturing unit 107 has a function of detecting the eye position and the line-of-sight direction of the driver or others on the basis of the analysis of the image of the camera 3, that is, so-called eye-tracking (line-of-sight tracking) function. Note that the driver-image capturing unit 107 may be mounted as an eye-tracking (line-of-sight tracking) device. Also as a modification example of the first embodiment, note that the on-vehicle system 100 may include the driver-image capturing unit 107.

The controller 10 has a point-of-view position detecting function that detects the point-of-view position of the driver in coordination with the driver-image capturing unit 107. In the third embodiment, the point-of-view position detecting function is particularly achieved by using the information acquiring unit 12. The information acquiring unit 12 acquires the point-of-view information containing the point-of-view position and the line of sight from the driver-image capturing unit 107. The information acquiring unit 12 stores and outputs the point-of-view information in addition to the above-described object information, distance information and vehicle information. Note that the point-of-view position or others may be computed by not the driver-image capturing unit 107 but the controller 10 or others. In this case, for example, the image of the camera 3 is input from the driver-image capturing unit 107 to the information acquiring unit 12, and the information acquiring unit 12 acquires the point-of-view position or others by analyzing the image using a publicly-known method.

The display position converter 14 performs the conversion processing for the display position of the AR image inside the AR display area 7 or others by using the eye position P1 of the point-of-view information or others supplied from the information acquiring unit 12. This conversion processing is different from the conversion processing of the first and second embodiments. The display position converter 14 corrects the display position of the AR image inside the AR display area 7 in the up and down direction (Y direction) in accordance with the point-of-view position P1 and the state of the angle θ. In the manner, the display position of the virtual image is matched with an appropriate position of the real image when being watched from the point-of-view position of the driver.

The driver-image capturing unit 107 has, for example, the following function. The driver-image capturing unit 107 determines an eye part from the image of the camera 3, and detects the eye position of the driver in the space (car). In FIG. 26, the eye position is at the positional coordinates (X1, Y1, Z1) of the pint p1 (position P1). Alternatively, the driver-image capturing unit 107 may determine and detect the driver's posture, motion or others from a position of a head or eyes. The driver-image capturing unit 107 may detect, for example, the line-of-sight direction (line of sight L1 of FIG. 26) of the driver on the basis of a publicly-known method of determining a pupil or an optical reflection point in the eyes. Alternatively, the driver-image capturing unit 107 can detect a tiredness state or sleeping of the driver or others by determining a state such as eye blinking inside the image.

[Driver's Seat]

FIG. 26 shows the vicinity of the driver's seat in the third embodiment although being almost similar to FIG. 2. In FIG. 26, the camera 3 of the driver-image capturing unit 107 is placed at a predetermined position "P3" in the car. The drawing shows a point "p3" that is a placement position of the camera 3 in the vehicle and an image-capturing direction "L3". In the present example, the camera 3 is placed in vicinity of an oblique upper side of the driver's seat. The drawing shows a case in which the image capturing direction L3 is oriented to the driver's seat and a face of the driver on an oblique lower side. The third embodiment provides the driver-image capturing unit 107 including the camera 3. Therefore, even when the point-of-view position of the driver changes, the point-of-view position can be tracked and detected. That is, the distance between the changing point-of-view position and the object or others can be also measured.

[Visual Recognition Area]

The HUD apparatus 1 of the third embodiment has a function of correcting the position of the AR display area 7 in the visual recognition area 5 by automatically adjusting the angle θ of the mirror 24A in accordance with the state of the point-of-view position and correcting the display position of the AR image inside the AR display area 7. Therefore, for example, when the visual recognition area 5 is watched from the point-of-view position P1B of the person with the second posture in FIG. 7, the visual recognition area 5 with the reduced display shift between the real image and the virtual image is watched. For example, the visual recognition area 5 as similar to the example of FIG. 22 in the second embodiment is watched. This visual recognition area 5 has been corrected so that the display position of the AR image inside the AR display area 7 is close to the object of the real image, and therefore, the display shift has been reduced. By the correction in accordance with the change of the point-of-view position, the angle θ of the mirror 24A is, for example, also automatically adjusted from the state of the angle θA in FIG. 7 to the state of the angle θB in FIG. 8. That is, the adjustment through the manual operation is unnecessary, and therefore, time and effort of the driver can be reduced.

[Processing Details (3-1)]

Next, details and a specific example of the processing of the controller 10 in the third embodiment will be described.

(1) When the AR function is used, the HUD apparatus 1 detects the eye position of the driver by using the camera 3 of the driver-image capturing unit 107, and outputs the point-of-view information.

(2) The information acquiring unit 12 of the controller 10 acquires the point-of-view information. On the basis of the information of the eye position P1 in the space contained in the point-of-view information such as the positional coordinates (X1, Y1, Z1) of the intermediate point between the both eyes, the information acquiring unit 12 computes a changed amount (referred to as a shift amount "Δ") in the case of the change of the point-of-view position. In the computation, the information acquiring unit 12 computes the changed amount (the shift amount Δ) of the eye position after the change from the reference position P1A by using the point-of-view position that is the basic setting as the reference, such as using the eye box EA centering the position P1A of FIG. 4. The shift amount Δ includes, for example, a shift amount Δh in the Y (up and down) direction and a shift amount Δd in the Z (front and back) direction. When the driver-image capturing unit 107 has a function of computing the shift amount Δ, note that the computation for the shift amount A by the controller 10 can be eliminated. The information acquiring unit 12 outputs the point-of-view information containing the shift amount A to the display position converter 14.

(3) In accordance with the change of the point-of-view position, the display position converter 14 controls the driving unit 25 so as to adjust the angle θ of the mirror 24A. The driving unit 25 changes the angle θ of the mirror 24A in accordance with a control signal supplied from the controller 10.

(4) In accordance with the change of the point-of-view position, the controller 10 controls the driving unit 25 so as to adjust the angle θ of the mirror 24A. The driving unit 25 changes the angle θ of the mirror 24A in accordance with a control signal supplied from the controller 10.

(5) The detector 26 detects the state of the angle θ of the mirror 24A changed by the automatic adjustment, and outputs the angle information to the information acquiring unit 12 of the controller 10.

(6) The information acquiring unit 12 of the controller 10 confirms the state of the adjusted angle θ, and outputs the state of the angle θ to the display position converter 14.

(7) The display position converter 14 performs a conversion processing that determines the positional coordinates (x, y) of the AR image inside the AR display area 7 on the AR flat surface 8 by using a predetermined conversion table (third conversion table) "T3" for use in the third embodiment on the basis of the point-of-view information containing the shift amount 4 and the state of the angle θ. This conversion processing is performed in real time, and includes the following processing. On the basis of the information of the positional coordinates (x, y) of the point Q of the object inside the image 6 and the distance D from the object in the space as similar to the first embodiment, the display position converter 14 computes the pixel coordinates (x, y) of the point V that is the display position of the AR image inside the AR display area 7. At this time, the display position converter 14 performs the conversion processing by using the conversion table T3.

(8) Also after that, the controller 10 adjusts the angle θ (sets the position of the AR display area 7) in accordance with the detection result of the change of the point-of-view position, and corrects the AR image inside the AR display area 7 as similar to the steps from (1).

[Conversion Table (3)]

FIG. 27 shows a concept of the computation using the conversion table 3 of the display position converter 14 in the third embodiment. The conversion table T3 is defined as conversion in accordance with the point-of-view position P1. A reference of the conversion is previously designed so as to correspond to, for example, the first state of the standard person as shown in FIGS. 2 to 4. That is, as the reference, the conversion table T1 as similar to the first embodiment is applicable. The conversion table T1 is multiplied by a coefficient "K2" for use in the third embodiment to configure the conversion table T3. The coefficient K2 is a coefficient based on the point-of-view position.

The coefficient K2 is determined by a predetermined function "F3". The function F3 is a function containing the shift amount Δ of the point-of-view position as a variable. The shift amount Δ of the point-of-view position is contained as an input value of the function F3. The coefficient K2 is acquired as an output value of the function F3. The function F3 is determined almost in accordance with the shape of the mirror 24A. The function F3 is previously stored in, for example, the memory (ROM) of the controller 10.

The shift amount Δ is a shift amount caused in change from the eye position (such as the position P1A) as the reference, and includes a shift amount Δh in the Y direction and a shift amount Δd in the Z direction. The shift amount Δ in the Y direction is equivalent to, for example, difference between a position "Y1A" (height "H1A") and a position "Y1B" (height "H1B") in FIG. 5. The information acquiring unit 12 acquires the shift amount Δ from the driver-image capturing unit 107, or acquires the shift amount Δ by computation based on the acquired point-of-view information.

As a modification example of the third embodiment, in order to increase a speed of the computation for the conversion processing using the conversion table T3, the Lagrange interpolation method can be applied as similar to the second embodiment.

As a modification example of the third embodiment, note that the controller 10 may control whether to execute the adjustment of the angle θ of the mirror 24A and the AR display area 7, a timing of the adjustment or others in accordance with the shift amount Δ of the point-of-view position such as comparison with a threshold range. For example, the controller 10 may perform the control so as not to change the angle θ and execute the conversion processing when the shift amount Δ of the point-of-view position is within a range corresponding to the eye box as the reference, or so as to change the angle θ and execute the conversion processing when the shift amount Δ is out of the range.

[Processing Details (3-2)]

In the system including the HUD apparatus 1, the point-of-view position is changed from the eye position as the reference (the position inside the eye box as the basic setting) by the change of the driver's posture or others. For example, the point-of-view position is changed from the position PIA of FIG. 4 to the position P1B of FIG. 5. As the shift amount Δ of the point-of-view position in this change, a shift amount Δh in the up and down direction (Y direction) and a shift amount Δd in the front and back direction (Z direction) are set. In this case, as shown in the examples of FIGS. 7 and 8, the expected angle and the depression angle caused when the virtual image is watched from the point-of-view position of the driver are different. Therefore, the depression angle αhud in the above-described expressions 3 and 4 is different. As a result of the different depression angle αhud, the display pixel coordinates (xhud, yhud) of the display element 22 is different. Therefore, the conversion table T1 is needed to be corrected, and thus, is corrected by using the coefficient K2 to configure the conversion table T3.

In the third embodiment, the controller 10 automatically adjusts the angle θ of the mirror 24A of the optical system 24 on the basis of the recognition of the changed point-of-view position. The controller 10 computes an appropriate angle θ (or a changed amount of the angle θ) in accordance with the shift amount Δ of the point-of-view position. This computation is achieved by using a predetermined function defining a relation between the shift amount Δ and the angle θ or others. When the angle θ is adjusted, the controller 10 outputs a control signal for use in the adjustment to the driving unit 25. The driving unit 25 drives a motor or others in accordance with the control signal to change the angle θ of the mirror 24A.

[Effects and Others]

As described above, the HUD apparatus 1 of the third embodiment has the function of automatically correcting the display position of the AR image inside the AR display area 7 in accordance with the eye position P1 of the driver, and therefore, the display shift between the real image and the virtual image is eliminated or reduced, so that the favorable AR display is achieved. In the third embodiment, time and effort for the adjustment of the mirror 24A through the manual operation of the driver can be reduced.

In the foregoing, the present invention has been concretely described on the basis of the embodiments. However, the present invention is not limited to the foregoing embodiments, and various modifications can be made within the scope of the present invention. The components of the embodiments can be added, eliminated, divided, synthesized, replaced, or combined with one another. Apart or all of the functions of the embodiments or others may be achieved by hardware such as an integrated circuit, or achieved by a software program processing. Each pieces of software may be previously stored in an apparatus at the time of product delivery, or may be acquired from an external apparatus through communication after the product delivery. The present invention is not limited to the on-vehicle system, and is applicable for various intended use.

EXPLANATION OF REFERENCE CHARACTERS

1 . . . HUD apparatus, 2 . . . camera, 3 . . . camera, 5 . . . visual recognition area, 7 . . . AR display area, 9 . . . windshield, 10 . . . controller, 11 . . . image input unit, 12 . . . information acquiring unit, 13 . . . AR image creating unit, 14 . . . display position converter, 15 . . . AR display, 20 . . . display, 21 . . . display driving circuit, 22 . . . display element, 23 . . . optical source, 24 . . . optical system, 25 . . . driving unit, 100 . . . on-vehicle system, 101 . . . ECU, 102 . . . outside-image capturing unit, 103 . . . image data storage, 104 . . . communication unit, 105 . . . GPS receiver, 106 . . . car navigation unit, 108 . . . sensor, 190 . . . DB unit

The invention claimed is:

1. A head up display apparatus displaying, to a driver, a virtual image superimposed on scenery ahead of a vehicle by projecting an image onto a windshield or a combiner of the vehicle, comprising:

an image input unit configured to receive an image captured by a camera *mounted on the vehicle* as input and extract *information related to* a predetermined object from the image;

an information acquiring unit configured to acquire object information containing a position of the object inside the image *input by the image input unit* and distance information containing a distance from the object in a space;

an image creating unit configured to create an image of the virtual image to be superimposed on the object, *based on the information acquired by the information acquiring unit*;

a converter configured to, by using the acquired information *from the information acquiring unit*, perform a conversion processing for correcting a position of a display area that is a range in which the image *created by the image creating unit* is displayable in a visual recognition area of the windshield or the combiner and a display position of the image inside the display area at least in a vertical up and down direction;

a display controller configured to *correct the image by using the converter, and* perform control for superimposing the image on the visual recognition area by using data caused after the correction; and a display,*including a light source, a display element creating video light based on light emitted from the light source, and a lens or a mirror guiding the video light emitted from the display element toward the visual recognition area, and* configured to superimpose the image on the visual recognition area in accordance with the control *of the display controller*, wherein the converter performs the conversion processing so that the display position of the image inside the display area matches the position of the object caused when the object is watched from a point-of-view position of the driver as a basic setting through the visual recognition area.

2. The head up display apparatus according to claim 1, wherein, in the converter, the [objet] *object* information and the distance information are input into a conversion table as input values, the conversion processing is performed, and the display position of the image inside the display area is acquired as an output value.

3. The head up display apparatus according to claim 1 mounted on an on-vehicle system, wherein the display performs projection display to the display area of the visual recognition area made in the windshield or the combiner of the vehicle.

[4. A display control method of a head up display apparatus displaying, to a driver, a virtual image superimposed on scenery ahead of a vehicle by projecting an image onto a windshield or a combiner of the vehicle, comprising:

an image input step of receiving an image captured by a camera as input and extracting a predetermined object from the image;

an information acquiring step of acquiring object information containing a position of the object inside the image and distance information containing a distance from the object in a space;

an image creating step of creating an image of the virtual image to be superimposed on the object;

a converting step of performing a conversion processing for correcting a position of a display area that is a range in which the image is displayable in a visual recognition area of the windshield or the combiner and a display position of the image inside the display area at least in a vertical up and down direction;

a display controlling step of performing control for superimposing the image on the visual recognition area by using data caused after the correction; and a display step of superimposing the image on the visual recognition area in accordance with the control, wherein, in the converting step, the conversion processing is performed so that the display position of the image inside the display area matches the position of the object caused when the object is watched from a point-of-view position of the driver as a basic setting through the visual recognition area.]

5. A head up display apparatus displaying, to a driver, a virtual image superimposed on scenery ahead of a vehicle by projecting an image onto a windshield or a combiner of the vehicle, comprising:

an image input unit configured to receive an image captured by a camera *mounted on a vehicle* as input and extract *information related to* a predetermined object from the image;

an information acquiring unit configured to acquire object information containing a position of the object inside the image *input by the image input unit* and distance information containing a distance from the object in a space;

an image creating unit configured to create an image of the virtual image to be superimposed on the object, *based on the information acquired by the information acquiring unit*;

a converter configured to, by using the acquired information *from the information acquiring unit*, perform a conversion processing for correcting a position of a display area that is a range in which the image *created by the image creating unit* is displayable in a visual recognition area of the windshield or the combiner and a display position of the image inside the display area at least in a vertical up and down direction;

a display controller configured to *correct the image by using the converter, and* perform control for superimposing the image on the visual recognition area by using data caused after the correction; and a display configured to superimpose the image on the visual recognition area in accordance with the control, wherein the display includes:

an optical system configured to guide image light of the image to the visual recognition area, the optical system including a mirror[.] *and* an angle of which is changeable[, and having a configuration in which a position of the display area inside the visual recognition area is changed by change of a projection position of the image light onto the visual recognition area in accordance with the angle];

a driving unit configured to perform driving so as to change the angle of the mirror on the basis of an operation of the driver or the control; and a detector configured to detect the angle of the mirror, [and]

*wherein a position of the display area inside the visual recognition area is changed by change of a projection position of the image light onto the visual recognition area in accordance with the angle of the mirror, and* the converter performs the conversion processing so that the display position of the image inside the display area matches the position of the object caused when the object is watched from a point-of-view position of the driver as a basic setting in accordance with the angle of the mirror through the visual recognition area.

6. The head up display apparatus according to claim 5, wherein, in the converter, a coefficient is determined in accordance with the angle, the [objet] *object* information and the distance information are input into a conversion table as input values by using the conversion table determined in accordance with the coefficient, the conversion processing is performed, and the display position of the image inside the display area is acquired as an output value.

7. The head up display apparatus according to claim 5 mounted on an on-vehicle system, wherein the display performs projection display to the display area of the visual recognition area made in the windshield or the combiner of the vehicle.

[8. A display control method of a head up display apparatus displaying, to a driver, a virtual image superimposed on scenery ahead of the vehicle by projecting an image onto a windshield or a combiner of a vehicle, comprising:

an image input step of receiving an image captured by a camera as input and extracting a predetermined object from the image;

an information acquiring step of acquiring object information containing a position of the object inside the image and distance information containing a distance from the object in a space;

an image creating step of creating an image of the virtual image to be superimposed on the object;

a converting step of, by using the acquired information, performing a conversion processing for correcting a position of a display area that is a range in which the image is displayable in a visual recognition area of the windshield or the combiner and a display position of the image inside the display area at least in a vertical up and down direction; and a display controlling step of performing control for superimposing the image on the visual recognition area by using data caused after the correction, wherein, as a display superimposing the image on the visual recognition area in accordance with the control, the head up display apparatus includes:

an optical system configured to guide image light of the image to the visual recognition area, the optical system including a mirror, an angle of which is changeable, and having a configuration in which a position of the display area inside the visual recognition area is changed by change of a projection position of the image light onto the visual recognition area in accordance with the angle;

a driving unit configured to perform driving so as to change the angle of the mirror on the basis of an operation of the driver or the control; and a detector configured to detect the angle of the mirror, and in the converting step, the conversion processing is performed so that the display position of the image inside the display area matches the position of the object caused when the object is watched from a point-of-view position of the driver as a basic setting in accordance with the angle of the mirror through the visual recognition area.]

9. A head up display apparatus displaying, to a driver, a virtual image superimposed on scenery ahead of a vehicle by projecting an image onto a windshield or a combiner of the vehicle, comprising:

an image input unit configured to receive an image captured by a camera *mounted on the vehicle* as input and extract *information related to* a predetermined object from the image;

an information acquiring unit configured to acquire object information containing a position of the object inside the image *input by the image input unit*, distance information containing a distance from the object in a space, and point-of-view information containing a point-of-view position of the driver who is watching a visual recognition area of the windshield or the combiner;

an image creating unit configured to create an image of the virtual image to be superimposed on the object, *based on the information acquired by the information acquiring unit*;

a converter configured to, by using the acquired information *from the information acquiring unit*, perform a conversion processing for correcting [a position of a display area that is a range in which the image is displayable in the visual recognition area and] a display position of [the] *an* image inside [the] *a* display area at least in a vertical up and down direction;

a display controller configured to *correct the image by using the converter and* perform control for superimposing the image on the visual recognition area by using data caused after the correction; and a display configured to superimpose the image on the visual recognition area by projection display in accordance with the control *of the display controller*, wherein the converter performs the conversion processing so that the display position of the image inside the display area matches the position of the object caused when the object is watched from the point-of-view position of the driver through the visual recognition area.

10. The head up display apparatus according to claim 9, wherein the display includes:

an optical system configured to guide image light of the image to the visual recognition area, the optical system including a mirror[.] *and* an angle of which is changeable[, and having a configuration in which a position of the display area inside the visual recognition area is changed by change of a projection position of the image light onto the visual recognition area in accordance with the angle];

a driving unit configured to perform driving so as to change the angle of the mirror on the basis of an operation of the driver or the control; and a detector configured to detect the angle of the mirror, [and]

*wherein a position of the display area inside the visual recognition area is changed by change of a projection position of the image light onto the visual recognition area in accordance with the angle of the mirror, and* the converter performs control so as to adjust the angle of the mirror in accordance with the point-of-view position, and performs the conversion processing so that the display position of the image inside the display area matches the position of the object caused when the object is watched from the point-of-view position in accordance with the adjusted angle through the visual recognition area.

11. The head up display apparatus according to claim 9, wherein, in the converter, a coefficient is determined in accordance with the point-of-view position or a shift amount of the point-of-view position, the [objet] *object* information and the distance information are input into a conversion table as input values by using the conversion table determined in accordance with the coefficient, the conversion processing is performed, and the display position of the image inside the display area is acquired as an output value.

12. The head up display apparatus according to claim 9 mounted on an on-vehicle system, wherein the display performs projection display to the display area of the visual recognition area made in the windshield or the combiner of the vehicle.

[13. A display control method of a head up display apparatus displaying, to a driver, a virtual image superimposed on scenery ahead of a vehicle by projecting an image onto a windshield or a combiner of the vehicle, comprising:

an image input step of receiving an image captured by a camera as input and extracting a predetermined object from the image;

an information acquiring step of acquiring object information containing a position of the object inside the image, distance information containing a distance from the object in a space, and point-of-view information containing a point-of-view position of the driver who is watching a visual recognition area of the windshield or the combiner;

an image creating step of creating an image of the virtual image to be superimposed on the object;

a converting step of, by using the acquired information, performing a conversion processing for correcting a position of a display area that is a range in which the image is displayable in the visual recognition area and a display position of the image inside the display area at least in a vertical up and down direction;

a display controlling step of performing control for superimposing the image on the visual recognition area by using data caused after the correction; and a display step of superimposing the image on the visual recognition area by projection display in accordance with the control, wherein, in the converting step, the conversion processing is performed so that the display position of the image inside the display area matches the position of the object caused when the object is watched from the point-of-view position of the driver through the visual recognition area.]

* * * * *